US006237021B1

(12) United States Patent
Drummond

(10) Patent No.: US 6,237,021 B1
(45) Date of Patent: May 22, 2001

(54) METHOD AND APPARATUS FOR THE EFFICIENT PROCESSING OF DATA-INTENSIVE APPLICATIONS

(75) Inventor: Brian Leslie Drummond, Eaglesham (GB)

(73) Assignee: Complex Data Technologies, Inc., Edina, MN (US)

( * ) Notice: Subject to any disclaimer, the term of this patent is extended or adjusted under 35 U.S.C. 154(b) by 0 days.

(21) Appl. No.: 09/161,168

(22) Filed: Sep. 25, 1998

(51) Int. Cl.$^7$ ..................................... G06F 13/00

(52) U.S. Cl. ........................................... 709/201

(58) Field of Search ................... 709/100, 102, 709/105, 106, 107, 200, 201; 712/1, 10, 14, 16, 20, 21, 28, 36

(56) References Cited

U.S. PATENT DOCUMENTS

| | | | | |
|---|---|---|---|---|
| 4,367,524 | * | 1/1983 | Budde et al. | 712/246 |
| 5,581,773 | * | 12/1996 | Glover | 712/14 |
| 5,752,070 | * | 5/1998 | Martins et al. | 712/33 |

OTHER PUBLICATIONS

Dandalis, A. et al., "Mapping Homogeneous Computations onto Dynamically Configurable Coarse—Grained Architectures", *IEEE Computer Soc. Press*. pp. 314–315 (1998).

Ebeling, C. et al., "Mapping Applications to the RaPiD Configurable Architecture", *IEEE Computer Soc. Press*, pp. 106–115 (1997).

Hartenstein, R. et al., "A Reconfigurable Data–Driven ALU for Xputers", *IEEE Computer Soc. Press*, pp. 139–146 (1994).

Hartenstein, R. et al., "A Synthesis System for Bus–based Wavefront Array Architectures", *IEEE Computer Soc. Press*, pp. 274–283 (1996).

Hartenstein, R. et al., "Exploiting Contemporary Memory Techniques in Reconfigurable Accelerators", 8th International Workshop, FPL '98, pp. 189–198 (1998).

Sharma, N. et al., "Introduction to the Warp Parallel Computer," http://www.mcs.kent.edu/docs/mcsparlmach/WarpIntro/WarpIntro.html, last updated Sep. 15, 1998, 6 pgs., no publication date.

Kim, W., "Systolic Matrix Multiplication," http://osl.cs.uiuc.edu/Papers/sc95/node20.html, last updated Sep. 15, 1998, 1 pg., publication date: Aug, 15, 1995.

Micron Product Information, "Synchronous Dram," pp. 1–49, ©1997, Micron Technology, Inc.

\* cited by examiner

*Primary Examiner*—Robert B. Harrell
(74) *Attorney, Agent, or Firm*—Schwegman, Lundberg Woessner & Kluth P.A.

(57) ABSTRACT

A system and method for providing a sustained, peak performance computing architecture is provided. A hardware processing architecture is provided for performing repeated algorithm iterations, wherein each of the algorithm iterations is performed on a parallel set of algorithm input data. The architecture includes a memory arranged to store the algorithm input data in parallel, contiguous bit locations. A parallel execution module having a plurality of functional execution units is provided, each of the functional execution units being configured to perform a preassigned function dictated by the algorithm on predetermined bits of each iterative parallel set of algorithm input data. A data flow module is coupled to the memory and to the parallel execution module, and is configured to replicate in hardware the control constructs and expression evaluations of the algorithm, and to distribute the input data to the plurality of function execution units in accordance with the control constructs and expression evaluations of the algorithm.

6 Claims, 23 Drawing Sheets

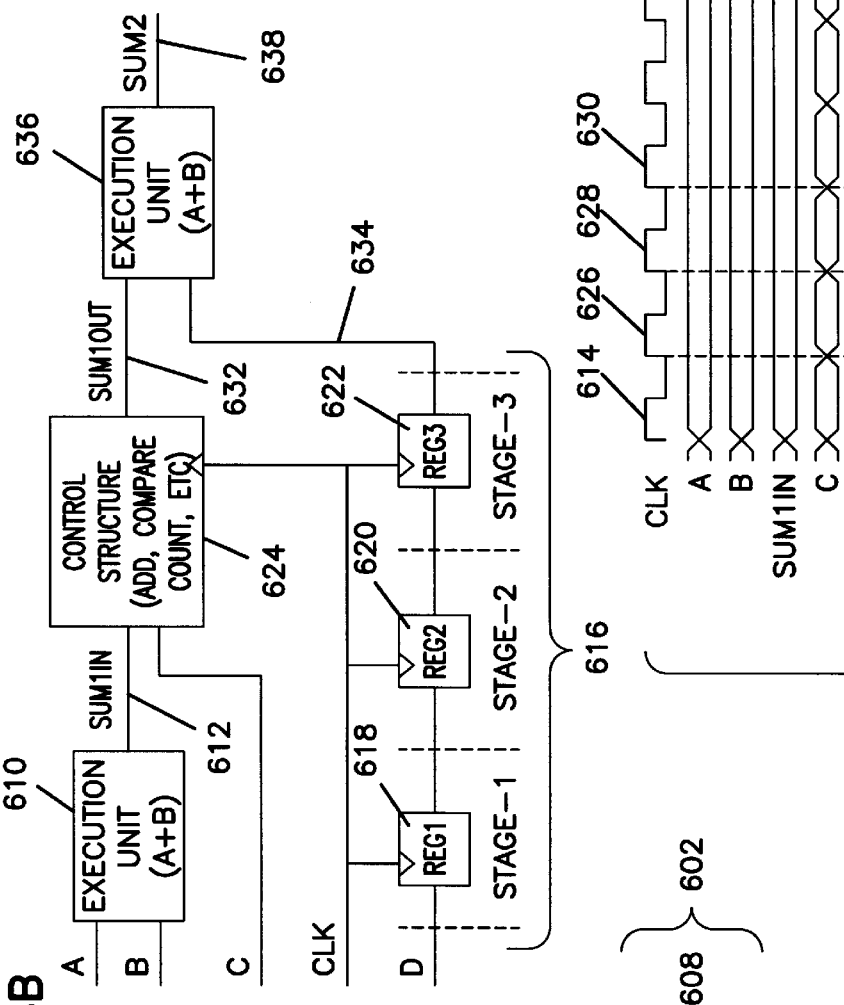
FIG. 6A
FIG. 6B
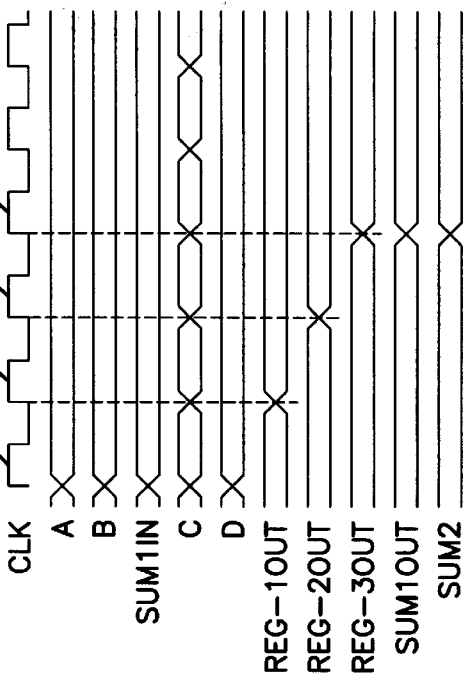
FIG. 6C

FIG. 10

```
        SUBROUTINE AVERAGE (INDATA, COUNT, MAX, MIN, AVG, RMS)      ─1000
          INTEGER COUNT
          PEAL INDATA (COUNT), MAX, MIN, AVG, RMS
C
C  THESE ARE THE INPUTS AND OUTPUTS TO THE FUNCTION
C    NAME    TYPE    MODE    LENGTH    DESCRIPTION
C    ====    ====    ====    =====     ========
C
C    INDATA   R      IN      COUNT     ARRAY OF INPUT VALUES
C    COUNT    I      IN                NUMBER OF VALUES TO AVERAGE
C    MAX      R      INOUT             MAXIMUM VALUE FOUND
C    MIN      R      INOUT             MINIMUM VALUE FOUND
C    AVG      R      OUT               AVERAGE OF ALL VALUES
C    RMS      R      OUT               ROOT-MEAN-SQUARE OF ALL VALUES
C
          REAL SUM, RMSSUM        ⎤─1002
          INTEGER I               ⎦
C  THESE ARE INTERNAL VARIABLES

C  INITIALIZATION OF INTERNAL VARIABLES
          SUM = 0.0               ⎤─1004
          RMSSUM = 0.0            ⎦

C  MAIN LOOP PROPER
          DO 100 I = 1, COUNT
             IF (INDATA (I) .LT. MIN) THEN  ⎤
                MIN = INDATA (I)            ⎬─1008
             ENDIF                          ⎦
             IF (INDATA (I) .GT. MAX) THEN  ⎤
                MAX = INDATA (I)            ⎬─1010
             ENDIF                          ⎦
             SUM = SUM + INDATA (I)  ─1012
             RMSSUM = RMSSUM + INDATA (I) * INDATA (I) ─1014
  100     CONTINUE
C  END OF MAIN LOOP

C  CALCULATE AVERAGE, RMS     ─1016
          AVG = SUM / COUNT
          RMSSUM = SQRT (RMSSUM/COUNT) ─1018
          END
```

(main loop bracket: 1006)

IF (INDATA (I) .LT. MIN) THEN
    MIN = INDATA (I)
ENDIF

IF (INDATA (I) .LT. MIN) THEN
    MIN = INDATA (I)
ENDIF

SUM = SUM + INDATA(I)

RMSSUM = RMSSUM + INDATA(I) * INDATA(I)

abs(a) NAIVE HARDWARE IMPLEMENTATION – 2 CYCLES abs(a) FASTER IMPLEMENTATION – 1 CYCLE

BINARY OPERATOR

BINARY OPERATOR WITH ONE EARLY OPERAND

TYPICAL SYSTEM BLOCK DIAGRAM

PIPELINE TO REDUCE MEMORY ACCESSES

IMPLEMENTATION OF REGISTER WITH ENABLE

HARDWARE IMPLEMENTATION OF CONDITIONAL STATEMENT

EXAMPLE HOST INTERFACE/PROGRAMMING MODEL

METHOD AND APPARATUS FOR THE EFFICIENT PROCESSING OF DATA-INTENSIVE APPLICATIONS

FIELD OF THE INVENTION

The present invention relates generally to computer architectures, and more particularly to a method and apparatus for providing a sustained, peak performance computing architecture having concurrent memory controllers and parallel execution circuitry integrally coupled via a comprehensive pipelined control structure capable of facilitating single-cycle execution of an algorithm.

BACKGROUND OF THE INVENTION

Computer architecture generally refers to a system designer's and programmer's view of a computer, which includes parameters such as memory, instruction sets, programmable registers, interfacing signals, and other aspects relating to the internal operation of computers. The processing power driving today's computers includes large ASICs designed for mainframe computers, as well as microprocessor and microcontroller devices housed in desktop PCs.

Technological computer architecture advances have typically evolved from the recognition of computing shortcomings facing the technology of the day. Where a new architecture may have solved a problem, it often created a new one. For example, memory caching, instruction pipelining, and reduced instruction set computers have all emerged to relieve a computing bottleneck of one form or another. Advances in other technologies, such as networking and telecommunications, have also inspired changes in computer architectures, while new design, fabrication and manufacturing techniques have permitted architectural improvements. At times, computer architecture progress forges straight ahead, yet at times is diverted off course. Some of the problems facing even the most current technologies stem from the commercial need to provide comprehensive and complex computing systems capable of operating over a broad range of applications. However, this reality can have a detrimental effect on processing performance for more specific applications.

For example, the Complex Instruction Set Computer (CISC) for years dominated the architectural race. CISC architectures were driven by the prevailing view that a large instruction set was desirable. The rationale behind this view was that by adding new, more specialized instructions, program execution would be accelerated due to a reduced number of instruction fetches. While this was true, other factors were adversely affecting program execution performance, including the inherent complexity associated with CISC processors that reduces the ability to speed up the Central Processing Units (CPU). Furthermore, many programs executed by these CPUs are produced by compilation which imposes a certain pattern on the utilization of the instruction set. Other factors also contributed to the realization that a better way of accomplishing greater processing speeds was needed.

Computer architecture then took a turn in an attempt to increase computing speed and performance, and Reduced Instruction Set Computers (RISC) were born. RISC processors are equipped with a restricted number of instructions and addressing modes, and the spared CPU logic is used for additional internal registers. While RISC processing certainly helped processing speeds, the technical limitations of memory was holding the technology down, as memory could not maintain the supply of data and instructions. Further, as the speed increased, it became more difficult to supply a fill 32-bit word from memory in a single cycle, since RISC processors require more instructions to perform the same job that what was required by a CISC processor. Additionally, the fixed instruction format of RISC processors resulted in RISC code using more memory. These problems were in part addressed by the high speed cache, and in some designs multiple caches, such as an instruction cache and a data cache. Again, these solutions raised new issues, such as cache coherency issues.

However, there are applications that are so data-intensive that use of a CISC, or even a RISC for that matter, is extremely inefficient. For applications where very large volumes of data must be processed quickly, these general architectures simply have too much overhead. The use of programs and program memory, program counters, memory fetching, address decode, bus multiplexing, branch logic, and the like are advantageous in some applications, but inherently result in undesirable overhead for certain other computing needs. Consider, for example, a recent seismic processing task in the oil industry. The task involved taking 30 gigabytes of input data, subjecting it to over 240 tera-operations on a supercomputer, and producing approximately 194 megabytes of output data. This task took approximately 2 months of CPU time on a state-of-the-art 24-processor machine. The current invention would cut this time to approximately 12 days if implemented using FPGA technology, and to approximately 4 days using ASIC technology.

Furthermore, in order to obtain even these lengthy processing turn-around times, it requires state-of-the-art computing power operating at the highest available clock rates, which means high equipment costs. The present invention, on the other hand, can be used with lower-performance host computers and still provide a substantial overall increase in processing speed. The host computers used in connection with the present invention can be "commodity" components, resulting in lower host computer costs.

Therefore, it would be desirable to provide a processing architecture having cutting edge computing speeds for use in data-intensive applications. Accordingly, the present invention provides a computer architecture capable of sustaining peak performance by exploiting the parallelism in algorithms and eliminating the latencies involved in sequential machines. The present invention provides a solution to the aforementioned and other shortcomings of the prior art, and offers additional advantages and benefits over existing computer architecture technologies.

SUMMARY OF THE INVENTION

The present invention is directed to a system and method for providing a sustained, peak performance computing architecture.

In accordance with one embodiment of the invention, a hardware processing architecture for performing repeated algorithm iterations is provided, wherein each of the algorithm iterations is performed on a parallel set of algorithm input data. The architecture includes a memory arranged to store the algorithm input data in parallel, contiguous bit locations. A parallel execution module having a plurality of functional execution units is provided, wherein each of the functional execution units is configured to perform a preassigned function dictated by the algorithm on predetermined bits of each iterative parallel set of algorithm input data. A data flow module is coupled to the memory and to the parallel execution module, and is configured to replicate in hardware the control constructs and expression evaluations of the algorithm, and to distribute the input data to the plurality of function execution units in accordance with the control constructs and expression evaluations of the algorithm.

In more specific embodiments, the data flow module comprises a pipelining structure facilitating algorithm outputs on each clock cycle. The pipeline structure synchronizes the arrival of input data at each of the functional execution units that would otherwise not receive the appropriate inputs at the functional execution units at the correct time. The pipeline structure also includes an overlaying pipeline structure that pipelines each of the different functional execution units, the control structures and the expression evaluation structures in the algorithm (i.e., all of the functional and control circuitry representing the algorithm) to facilitate outputting of an algorithm in each clock cycle.

In accordance with another embodiment of the invention, a processing system for carrying out data-intensive computing applications is provided. The system includes at least one data server capable of outputting stored test data, and one or more host computing devices coupled to receive the test data from the data server. One or more processing modules are provided within each of the one or more host computing devices. Each of the processing modules within their corresponding host computing device is coupled to receive the test data from its corresponding host computing device. Each of the processing modules includes a memory arranged to store the algorithm input data in contiguous, parallel bit locations, and also includes a parallel execution module including multiple functional execution units. Each of the functional execution units is configured to perform a preassigned function dictated by the algorithm, and performs the function on predetermined bits of each iterative parallel set of algorithm input data. The processing modules also include a data flow module coupled to both the memory and the parallel execution module, and is configured to replicate in hardware the control constructs and expression evaluations of the algorithm. The data flow module also distributes the input data to the function execution units in accordance with the control constructs and expression evaluations as dictated by the algorithm.

In accordance with another embodiment of the invention, a hardware processing architecture for performing repeated algorithm iterations is provided, wherein an algorithm iteration associated with each parallel set of algorithm simulation data is output in each cycle of a clock signal. The processing architecture includes a memory arranged to store the algorithm simulation data in contiguous bit locations, and multiple execution units for performing a predetermined function of the algorithm given a predetermined portion of the simulation data. A data distribution mechanism is coupled to the memory to receive the simulation data, and to distribute the simulation data to each of the function execution means as dictated by the algorithm. Control structure circuitry, integrally interposed with the data distribution mechanism, replicates the algorithm control constructs and expression evaluations in hardware. A data synchronization structure, integrally interposed with the data distribution mechanism, synchronizes the arrival of confluent simulation data streams at each of the multiple execution units and the control structure mechanism. In one embodiment of the invention, the data synchronization structure includes a full-algorithm pipeline which facilitates output of an algorithm iteration in each clock cycle.

In accordance with another aspect of the invention, a method for transforming an algorithm into a hardware implementation of the algorithm is provided. The method provides a resulting algorithm implementation which produces an algorithm output for each iterative loop of the algorithm in each clock cycle. The method includes outputting a parallel set of the stored test data from the processing memory in each of the clock cycles. Predetermined functions of the algorithm are repetitively performed on each of the parallel sets of test data output from the processing memory, using corresponding functional execution units. The test data is distributed via discrete transmission paths to the functional execution units according to the control constructs and expression evaluations of the algorithm. The method also includes synchronizing the arrival of confluent test data streams for each of the predetermined functions, control constructs and expression evaluations of the algorithm implementation. Further, the predetermined functions, control constructs and expression evaluations are fully pipelined in two dimensions to provide an output for each iterative loop of the algorithm in each clock cycle.

The above summary of the present invention is not intended to describe each illustrated embodiment or implementation of the present invention. This is the purpose of the figures and the associated discussion which follows.

BRIEF DESCRIPTION OF THE DRAWINGS

FIG. 6A illustrates a sample core routine that can be transformed in accordance with the present invention;

FIG. 6B is a block diagram of an example implementation of a core routine loop segment provided in FIG. 6A;

FIG. 6C is a timing diagram of the transformed core routine loop segment of FIG. 6B;

FIG. 10 represents a software routine programmed to calculate the maximum, minimum, root-mean-square (RMS) and average values in a sequence of numbers that is capable of transformation in accordance with the invention;

DETAILED DESCRIPTION OF THE VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made, without departing from the scope of the invention.

The present invention provides a highly efficient computer architecture capable of sustaining peak performance for computing applications, particularly data-intensive computing applications. Sustained, peak-performance processing in accordance with the present invention is realized using multiple parallel processing units designed in connection with a data flow module that together allow a functional algorithm to be executed within a single clock cycle.

Generally, the present invention includes multiple execution units that operate in parallel to allow the functional algorithm to be interpreted in hardware. The data flow unit allows control loop constructs and expression evaluations, which are conventionally performed by a series of software programming instructions, to be embodied into an architecture for moving data as defined by the functional algorithm. Proper pipelining of the control loop constructs and expression evaluations provides for manifestation of the algorithm's control functions in hardware. The data flow unit also controls memory operation by direct means such that raw input data is provided to the processing architecture on each clock cycle.

The multiple execution units, together with the data flow unit's control structures, potentially deep pipelining, direct variable-length memory control, and dedicated data distribution paths together facilitate complete exploitation of each and every execution unit and control structure each clock cycle, thereby outputting a complete pass of the functional algorithm each clock cycle. This integrated computing architecture results in a fully-exploited, sustained-execution processing architecture capable of performing voluminous data computations at remarkable speeds.

Figure 1:
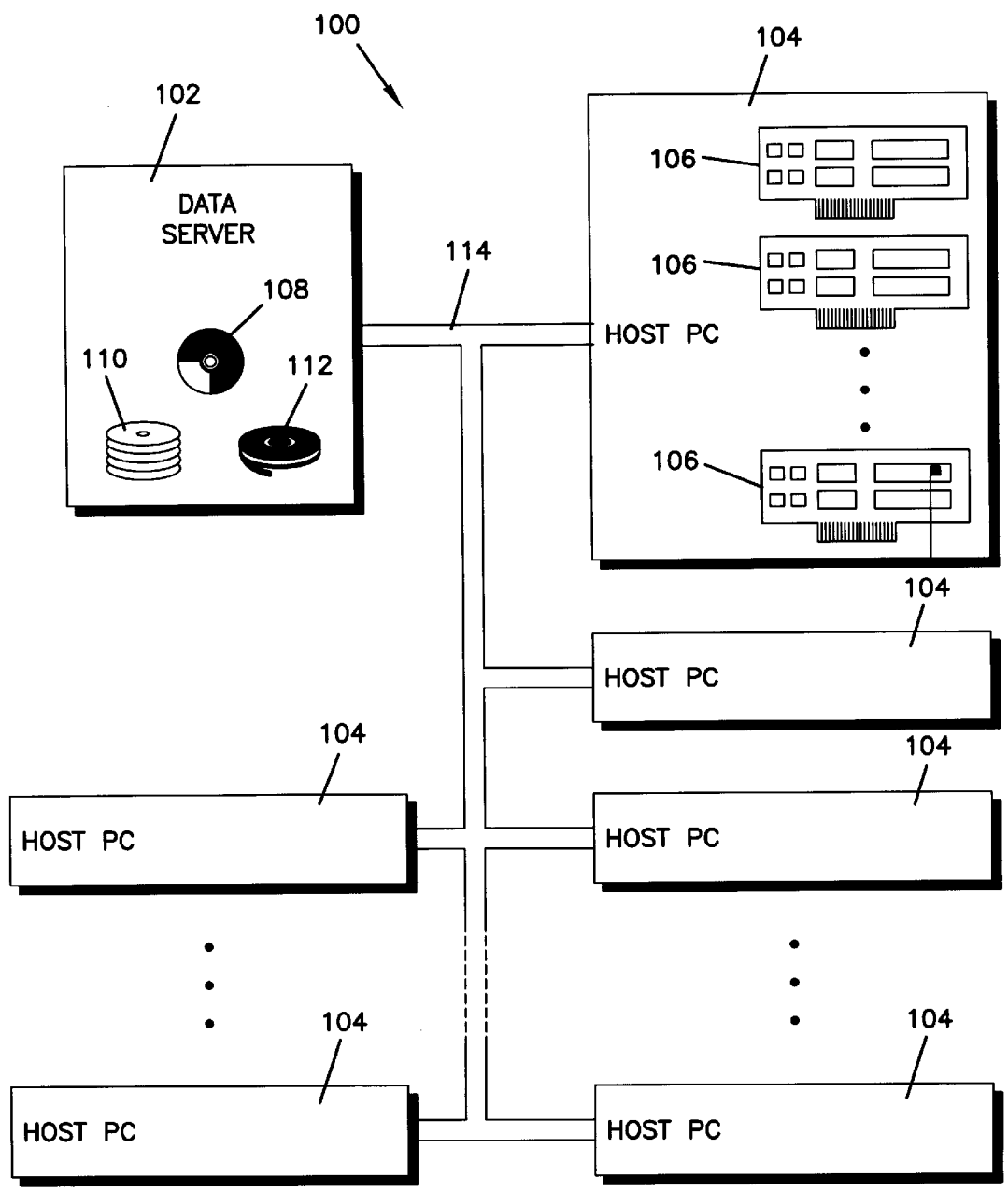
FIG. 1 is a block diagram illustrating one embodiment of a computing system environment in accordance with the present invention.

Referring now to FIG. 1, a diagram is provided illustrating one embodiment of a system environment in accordance with the present invention. The computing system 100 includes at least one data server 102 that is networked to one or more host PCs 104. As will become more apparent, this type of arrangement is used to supply stored or real-time data to the unique execution modules which are described below. The execution modules can be housed on printed circuit boards 106, and plugged into expansion slots in its respective host PC 104. Each of the host PCs 104 illustrated in FIG. 1 can contain any number of the printed circuit boards 106 that house multiple execution units. The number of execution units and printed circuit boards is dependent on the processing needs of the particular application. The host PCs 104 are depicted as personal computers, however it should be recognized that any computing unit can be used, such as a workstation or other computing device.

The system illustrated in FIG. 1 provides a means for supplying large amounts of data to the execution modules, where the data is processed. The one or more data servers 102 can store the data in any known fashion, including CD-ROMS 108, hard disks 110, tapes 112, or any other storage mechanism. Before further describing the system 100 and corresponding operation, it is beneficial to obtain an understanding of the type of data that will be provided by the data server 102.

The present invention is designed to process extremely large volumes of data. For example, many scientific simulations may involve millions, billions, or perhaps hundreds of billions of simulation test points. Such scientific simulations can be envisioned in a variety of fields of technology, including geological, medical, and any other field requiring a very large number of test points to obtain a satisfactory simulation. In such cases, these test points can come in the form of alphanumeric characters, integer or fractional numbers, patterns, or any other information that can ultimately be stored in a digital format.

The storage media of the data server, such as the CD-ROMS 108, hard disks 110, or tape 112, provide the storage capability for these massive quantities of data. However, collecting the data is only the first step in the simulation. Once gathered, all of the information must be processed—and must be processed efficiently.

In many scientific simulation experiments, gathering the data may or may not take a great deal of time. However, it is often the case that the capacity available for gathering the data is comparatively large with respect to the number of analysts available to evaluate the results of the processed simulation. This can result in a very large backlog of stored simulation test points that require processing. The lack of computer performance in today's more general purpose computer architectures exacerbates the problem, as the analysts have to wait an unacceptably long time before all of the test points for just one simulation have been processed. Therefore, for such data-intensive applications, the processing bottleneck must be broken.

The present invention transfers these large volumes of data from the data server 102 to the one or more host PCs 104 by way of a network 114. Any network configuration capable of providing the data in the data server to each of the host PCs can be employed, such as an ethernet connection. The host PC 104 is used primarily to receive the data, and to route the data to the execution units depicted by way of example on each printed circuit board 106. The execution units provide the efficient processing deserving of such data-intensive applications.

Figure 2:
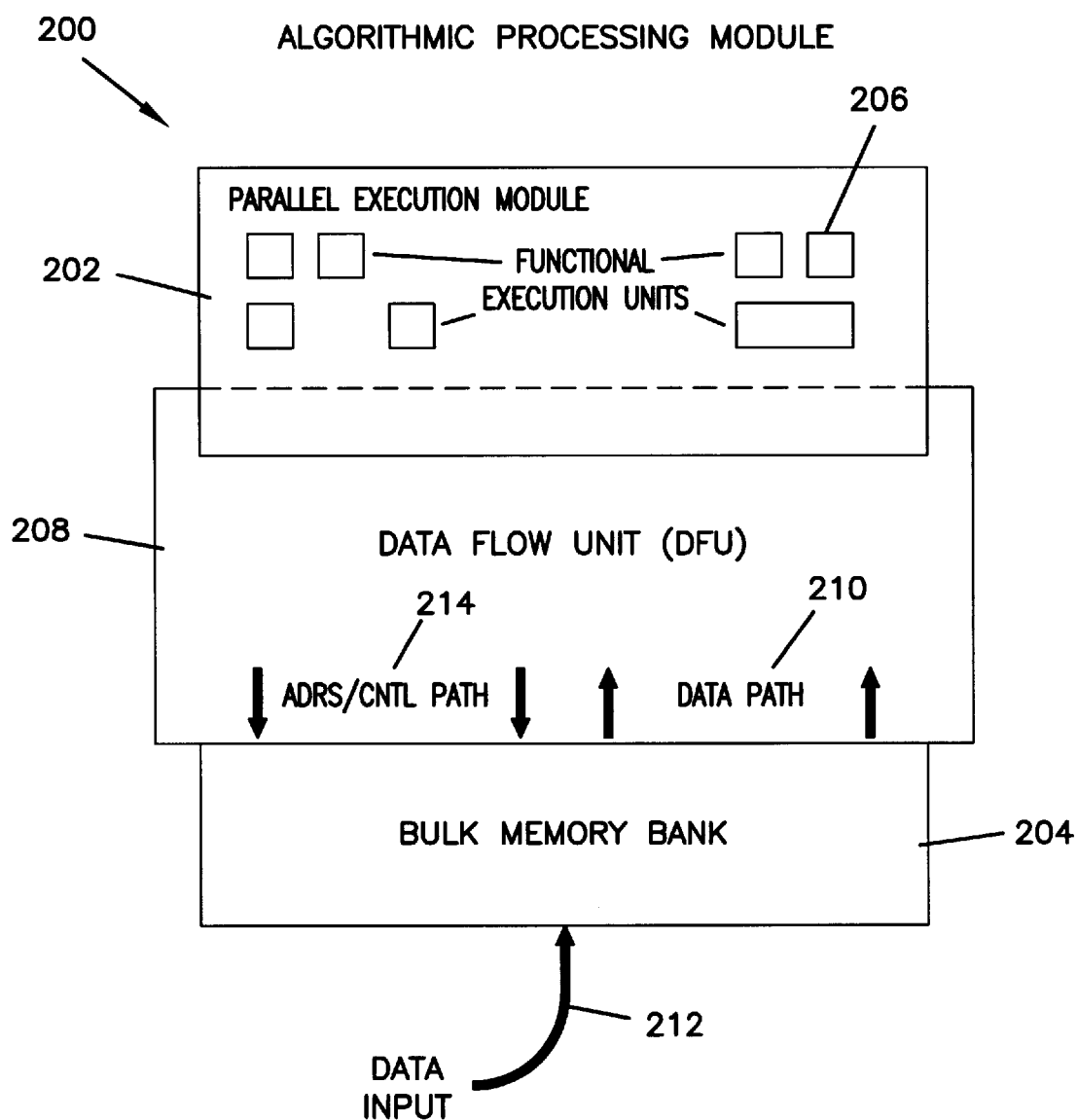
FIG. 2 is a block diagram illustrating one embodiment of a sustained-execution processing module in accordance with the present invention.

FIG. 2 is a block diagram illustrating one embodiment of a sustained-execution processing module 200 in accordance with the present invention. In one embodiment, each circuit board 106 includes one or more such processing modules 200. Data provided by the server 102 is provided to a particular host PC 104, and then to their respective processing modules 200. The host PC 104 is used only to move the data between the server 102 and the processing modules 200, and does not perform the computational processing associated with the functional algorithm. In such cases, the circuit boards 106 may include input/output (I/O) circuitry to receive the raw data, and to return data results. In this configuration, the host PCs 104 can be rack-mounted as no user input or display is necessary. It will be recognized by those skilled in the art from the following description that implementations of the processing modules are available without the use of a host PC 104 to provide the information. For example, the processing modules 200 can be directly coupled to a data server 102 under appropriate circumstances, or alternatively can directly receive the raw data from local storage media or a real-time connection.

The processing module 200 of FIG. 2 includes a parallel execution module 202 and a bulk memory bank 204. The parallel execution module 202 includes multiple functional execution units 206 that implement executable portions of the desired functional algorithm in hardware. The configuration of the parallel execution module 202 is therefore dictated by the algorithm to be executed. When the algorithm changes, the parallel execution module 202 is modified accordingly. This can be effected in a variety of ways, but in preferred embodiments the multiple execution units are implemented in application-specific integrated circuits (ASICs), gate arrays, or field-programmable gate arrays (FPGAs), which can be modified when necessary. ASIC design minimizes, and perhaps eliminates, hardware redundancies and provides higher speed/performance, but the design must be complete before the ASIC is constructed. FPGAs provide freedom to modify an algorithmic design, but pay for this freedom in the way of reduced processing speed.

As will be described in greater detail below, all of the multiple execution units 206 are concurrently utilized to sustain peak execution rates. In other words, in every clock cycle, the processing capability of every execution unit 206 of the parallel execution module 202 is being exploited. This sustained processing activity maximizes processing efficiency, thereby circumventing the overhead inefficiencies of general processing computers. This is made possible in part due to the full hardware implementation of the functional algorithm, but requires many additional considerations related to bussing and data distribution, memory functions, memory control and proper data pipelining, all of which are discussed more fully below. The result is a unique, cost-effective computing architecture capable of sustaining peak performance for data-intensive applications.

Cooperating with the parallel execution module 202 is a data flow unit (DFU) 208. The DFU 208 serves a variety of purposes, including memory control and address/control signal distribution, algorithm control loop facilitation, expression evaluation, and data path distribution, all of which play a part in the realization of the functional algorithm.

The DFU 208 and the parallel execution module 202 are depicted as overlapping to illustrate their relationship. As will be described more fully below, selected ones of the functional execution units 206 are used in connection with the DFU 208 to create control structures corresponding to the control flow of the algorithm. The resulting control structures are therefore dictated by the particular algorithm to which the architecture is directed.

Raw data to which the functional algorithm is to be applied is stored in a data memory, illustrated in FIG. 2 as a bulk memory bank 204. In one embodiment of the invention, the bulk memory 204 includes a Synchronous Dynamic Random Access Memory (SDRAM) capable of supplying data to the DFU 208 in selected lengths of burst data. In more conventional computing environments, DRAM is often used as a means to refresh cache memory. In the present invention, no cache memory is required. The memory is controlled by the memory control module (not shown) which is integrally designed into the DFU 208.

The memory 204 is controlled such that cache-level performance is obtained without the use of memory caches. As is described in greater detail below, the integrated memory controller within the DFU 208 is designed to allow for variable-length data bursts from the memory 204 to the DFU 208 as often as each clock cycle. The data path 210 takes on the maximum width of the memory data output (e.g., 16, 32, 64 bits), and supplies the DFU 208 and the functional execution units 206 with data via a predetermined data distribution arrangement.

Multiple memory units can be arranged in parallel to provide any data width desired within the bulk memory bank 204. The data path 210 is an aggregation of the one or more memory unit outputs. For example, where 16-bit SDRAMs are utilized, four SDRAMs may be used in parallel to provide a 64-bit data path 210.

The host PC 104 supplies the raw data to the bulk memory bank 204 via a data input path 212. The memory bank 204 is configured to operate in a burst mode. In one particular embodiment, a commercially-available Micron Technology, Inc. MT48LC4M16A1/A2 SDRAM is used as the memory 204. This SDRAM allows for full-page data bursts with a burst terminate option. The present invention uses such a data burst to provide continuous blocks of data to the DFU 208, optimally on every clock cycle.

The data path 210 distributes the data in a manner that ensures that all individual execution units 206 in the parallel execution module 202 and the DFU 208 receive data efficiently, such as on each clock cycle. In this manner, all buses in the distributed data path 210 are transmitting data in each clock cycle. The data distribution structure is dictated by the algorithm that is being implemented, and allows the algorithm to be executed in a single clock cycle. In one embodiment of the invention, this is accomplished through the use of non-multiplexed, discrete buses. The data path 210 is therefore replenished with new data from the memory bank 204 on each clock cycle, and supplies the data to the appropriate execution units 206 and the DFU control structures in each clock cycle. It should be recognized that a multiplexing bus can be used without departing from the scope and spirit of the invention, but a penalty is paid as additional clock cycles are necessary to carry out each pass or loop of the algorithm.

The integrated memory control within the DFU 208 controls the data flow from the bulk memory bank 204 to the DFU 208. The invention allows for the elimination of cache memory by distributing processors, and obtaining cache-like performance using the bulk memory 204 as controlled by the integrated memory control. An address/control path 214 couples the integrated memory controller to the bulk memory bank 204, and transmits the appropriate address and control signals required to obtain the desired memory output. The memory control is further described in connection with FIG. 3.

Figure 3:
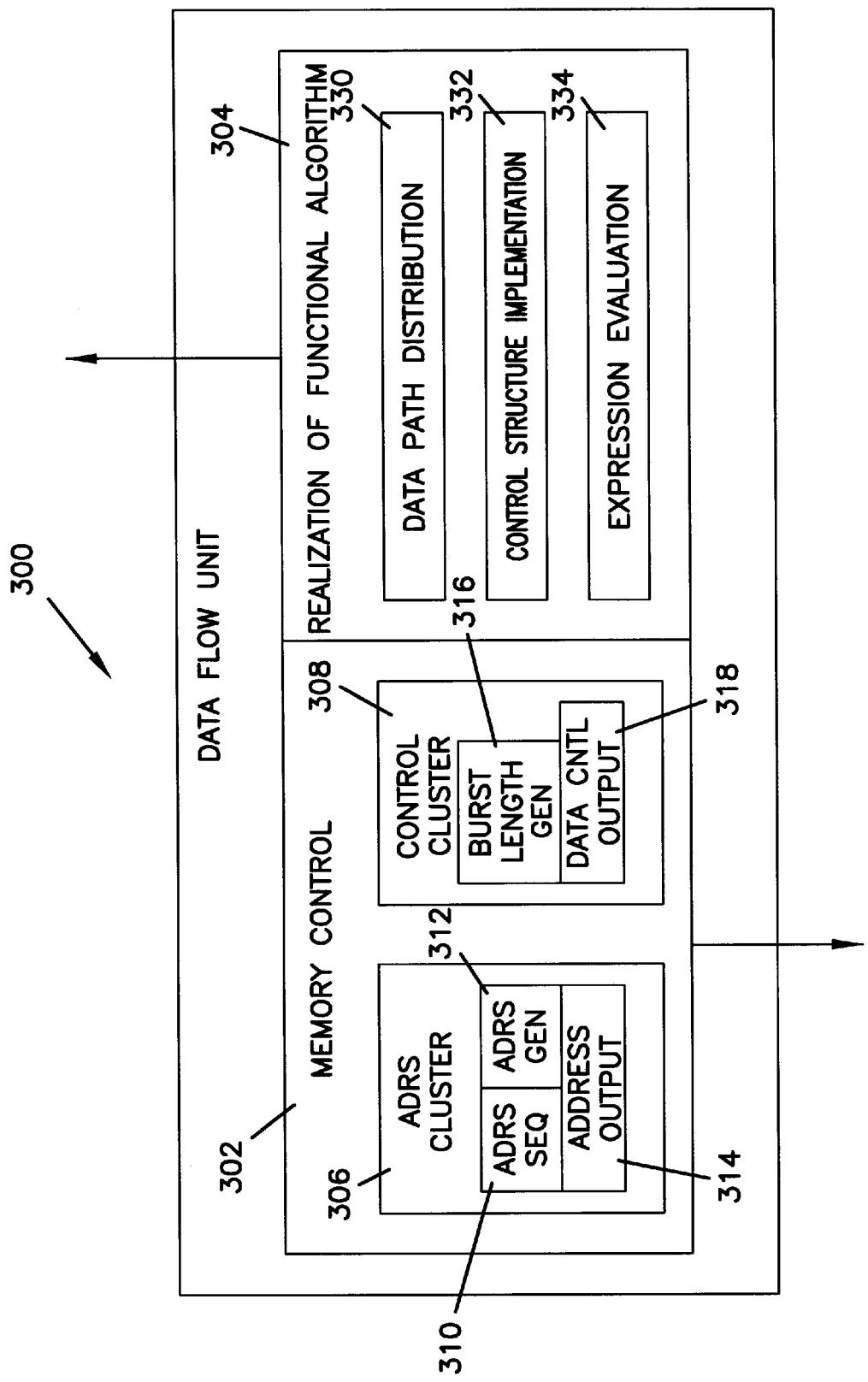
FIG. 3 is a block diagram illustrating one embodiment of a data flow unit (DFU) in accordance with the present invention.

FIG. 3 is a block diagram illustrating one embodiment of a data flow unit (DFU) 300 in accordance with the present invention. For purposes of illustration, the DFU 300 is functionally described as a separate and distinct module, however, the DFU 300 cooperates with the parallel execution module 202 and the bulk memory bank 204 such that the functions merge. The DFU 200 of FIG. 3 is described as a stand-alone unit in order to provide a clear description of its functionality.

The example DFU 300 includes a memory control module 302 and a module 304 for realization of the functional algorithm. The memory control module 302 is designed in hardware such that all address and data control signals are derived and transmitted in a single clock cycle. The memory control module 302 includes an address cluster 306, and a data control cluster 308. While the particular implementation of the address cluster 306 is dependent on the functional algorithm being implemented, and therefore on the particular manner in which data must be read from the bulk memory bank 204, FIG. 3 provides a representative address cluster 306. The address cluster 306 includes address sequencing functionality 310, address generation functionality 312, and an address output 314. The address generator 312 generates a starting address for a memory fetch. Because a preferred embodiment of the present invention involves the use of memory block transfers by way of memory "bursts", only one starting address needs be provided for any giving block of data that is desired. The starting address is output to the bulk memory bank 204 via the address output 314 which comprises a dedicated, non-multiplexing data distribution path coupled directly to the address input of the memory 204. The address sequencer 310 recognizes the length of a desired burst of data, and notifies the address generator 312 when the next block of data requiring a new starting address is to be transmitted. In one embodiment, the address sequencer 310 is set to automatically increment to the next burst starting address when the desired burst count is reached, so that only a clock pulse is required as input to the memory controller. It should be recognized that the address cluster 306 is constructed in hardware such that an address can be output from the address output 314 needing only the receipt of a single clock pulse. Pipelining within the address cluster 306 can be implemented where necessary to insure that a starting address is provided at the address output 314 on the next available clock pulse following transmission of a complete data block.

The data control cluster 308 is similarly constructed in hardware. The control cluster 308 includes a burst length generator 316 which provides control signals to the bulk memory bank 204 via the data control output 318. For memory devices which allow burst transfers of particular lengths, the burst length generator can provide the number of bytes desired. In one embodiment of the invention, burst length generation is not required. In that particular embodiment, an SDRAM capable of performing full-page bursts with a burst terminate option is utilized. In this case, a starting address plus a full-page burst command can be presented to the SDRAM, and the address sequencer 310 thereafter provides a burst terminate command when appropriate. For example, the address generator 312 can output a starting address to the memory 204 along with a command to initiate a burst transfer. A predetermined number of bytes later, the address sequencer 310 can provide a burst terminate command via the address output 314 to the memory 204 to stop the burst transfer after a predetermined number of bytes have been transferred from the memory 204. This memory control configuration eliminates control signal protocols which require additional clock cycles. The memory control 302 is therefore a variable-length memory controller providing variable-length data bursts as required by the algorithm, which may or may not require the use of a potentially deep pipeline. For example, where a 100-byte data burst is provided to the data flow unit to perform the functional algorithm, a 100-register pipeline can be used in the memory control module 302 to ensure timely presentation a subsequent data burst starting address immediately upon transmission of the final byte of a preceding memory burst. It should also be recognized that, depending on the format of the raw data in the bulk memory bank 204, the memory control module 302 can be configured to provide variable-length data bursts (i.e., 30 bits in a first burst, 31 in a second burst, etc.). The variable-length burst control can also be varied to accommodate different algorithms. Furthermore, in one embodiment of the invention, "tiling" is implemented to provide data bursts from within a single row of memory to avoid address wrap-around conditions. This allows the "structure" of the memory to be exploited, as opposed to viewing it as a homogeneous bank of storage cells.

As can be seen from the foregoing description, the memory control and memory control pipeline eliminates the possibility of even one clock cycle occurring where no data is presented. Therefore, the present invention is "fully pipelined", meaning it is pipelined to the extent that every clock cycle produces a valid algorithm output.

The memory control module 302 therefore becomes a physical replica of the memory control portion of the functional algorithm. The memory access patterns generated by the memory control 302 provide for sustained execution of the DFU 208 and parallel execution module 202 shown in FIG. 2. This allows all functional execution units within the processing module to be concurrently and continually active. Direct, non-multiplexed distribution paths between the memory control 302 and the memory facilitate single cycle memory control. This configuration results in "cache-like" performance using standard memory.

The data flow unit 300 also includes the algorithm realization module 304. This section of the data flow unit 300 is a physical manifestation of the processing algorithm to be executed. In order physically embody the algorithm into hardware, the algorithm realization module 304 includes various functions including data path distribution 330, control structure implementation 332, and expression evaluation 334.

The algorithm realization module 304 also works in connection with functional execution unit 206 described in connection with FIG. 2. The data path distribution 330 essentially includes the bussing and data pipe lining required to effect single cycle execution. The bussing architecture within the algorithm realization module 304 includes discreet, dedicated buses to provide the data from the memory bank 204 to the desired one or more functional execution units 206. These buses are non-interleaved, non-multiplexed buses that are dictated by the particular functional algorithm being implemented. Multiplex data buses would require additional clock cycles. Pipe lining may also play an important role in the distribution of data depending on the particular algorithm to be implemented. Pipelining is described in greater detail in connection with the description of FIGS. 6A, 6B and 6C.

The control structure implementation 322 of the DFU 300 represents a transformation of the control flow of the algorithm being implemented. The control flow of the algorithm is essentially mapped into a corresponding control structure in the DFU 300. The DFU 300 also includes expression evaluation 334. An "expression" is a combination of variables, function calls, and operators that result in a single value. For example, A+(B×C) is a combination of addition and multiplication operators resulting in an expression. The expression evaluation 334 element of the DFU 300 accounts for such expressions.

Figure 4:
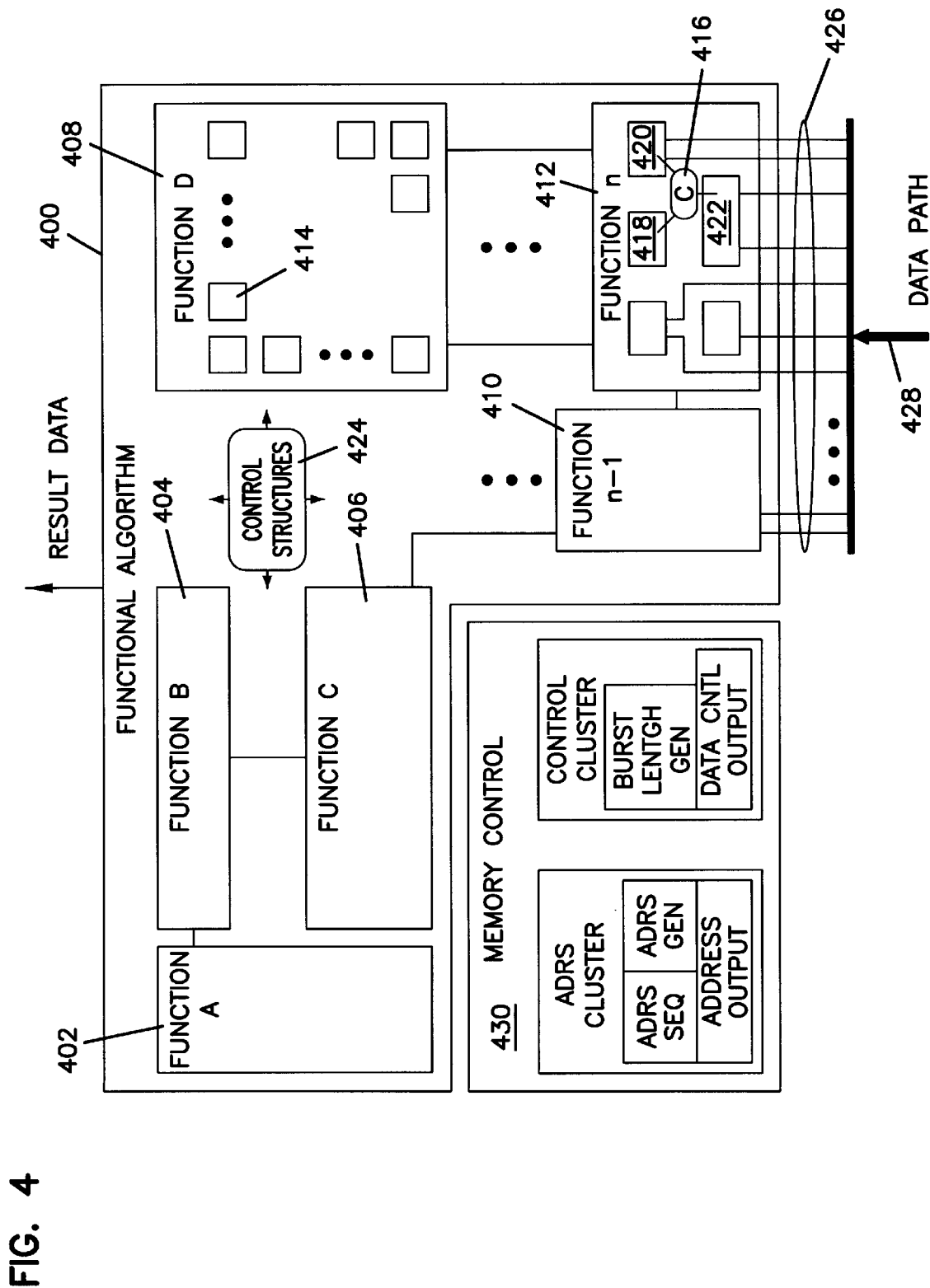
FIG. 4 is a block diagram conceptually depicting a transformation of a functional algorithm into hardware in accordance with the present invention.

FIG. 4 is a block diagram conceptually illustrating a hardware manifestation of a functional algorithm in accordance with the present invention. For purposes of illustration and not of limitation, the functional algorithm 400 of FIG. 4 is depicted as having multiple functions, including function A 402, function B 404, function C 406, function D 408, through function n-1 410 and function n 412. The number of processing functions to be performed is dependent upon the particular algorithm to be applied in hardware. To perform any particular function, multiple sub-functions may be necessary. For example, looking now to function D 408, one particular sub-function is illustration as sub-function 414. As an example, function D 408 may represent an absolute value function, and the sub-function 414 may represent one of a plurality of inverters used in the particular implementation of an absolute value function.

The control structure implementation 332 in the DFU 300 integrally cooperates with the sub-functions of a particular function, as illustrated by the control structure designator 416 of function n 412. The control structure 416 provides the interconnection between the sub-functions 418, 420 and 422 as dictated by the algorithm. Similarly, the control structures of the DFU 300 allow the functions of the algorithm to be processed in accordance with the control flow of the algorithm as depicted by the control structure block 424. The functions and sub-functions illustrated in the functional algorithm 400 are typically accomplished using the functional execution units 206 previously described in connection with FIG. 2.

The data path distribution 330 described in connection with FIG. 3 is partially illustrated as the input bus 426 which is the data path 428 as received from the bulk memory bank. The individual connections on the bus 426 are provided to their corresponding functional units of the algorithm as illustrated by the individual connections directed to the sub-functions of function n 412. The data is acted upon at function n 412, and the results are then forwarded to subsequent stages of the algorithm performed by other functions such as D 408 and function n-1 410. Timing considerations are accounted for using pipeline registers, which will be described in greater detail below.

The memory control module 430, analogous to the memory control module 302 of FIG. 3, performs the functions previously described in connection with FIG. 3. As was previously described, the memory control module 430 ensures a continual stream of data to the data path 428 to be distributed throughout the functional algorithm 400 by way of the bus 426. The functional execution units, sub-functions, functions, control structures, discreet bussing, and pipeline structures of the functional algorithm 400 allow the functional algorithm to be executed in a single clock cycle when the pipeline, if any, is full. Therefore, where software execution of an algorithm is a sequential process involving perhaps multiple clock cycles on certain steps of the algorithm, the entire functional algorithm can be affected in a single clock cycle with the present invention. Where the functional algorithm is continually repeated, for example, is repeatedly looped to perform similar computations on large volumes of test data input, a simulation on the test data can be provided on each clock cycle. This substantially increases the rate at which the raw test data can be simulated.

Figure 5:
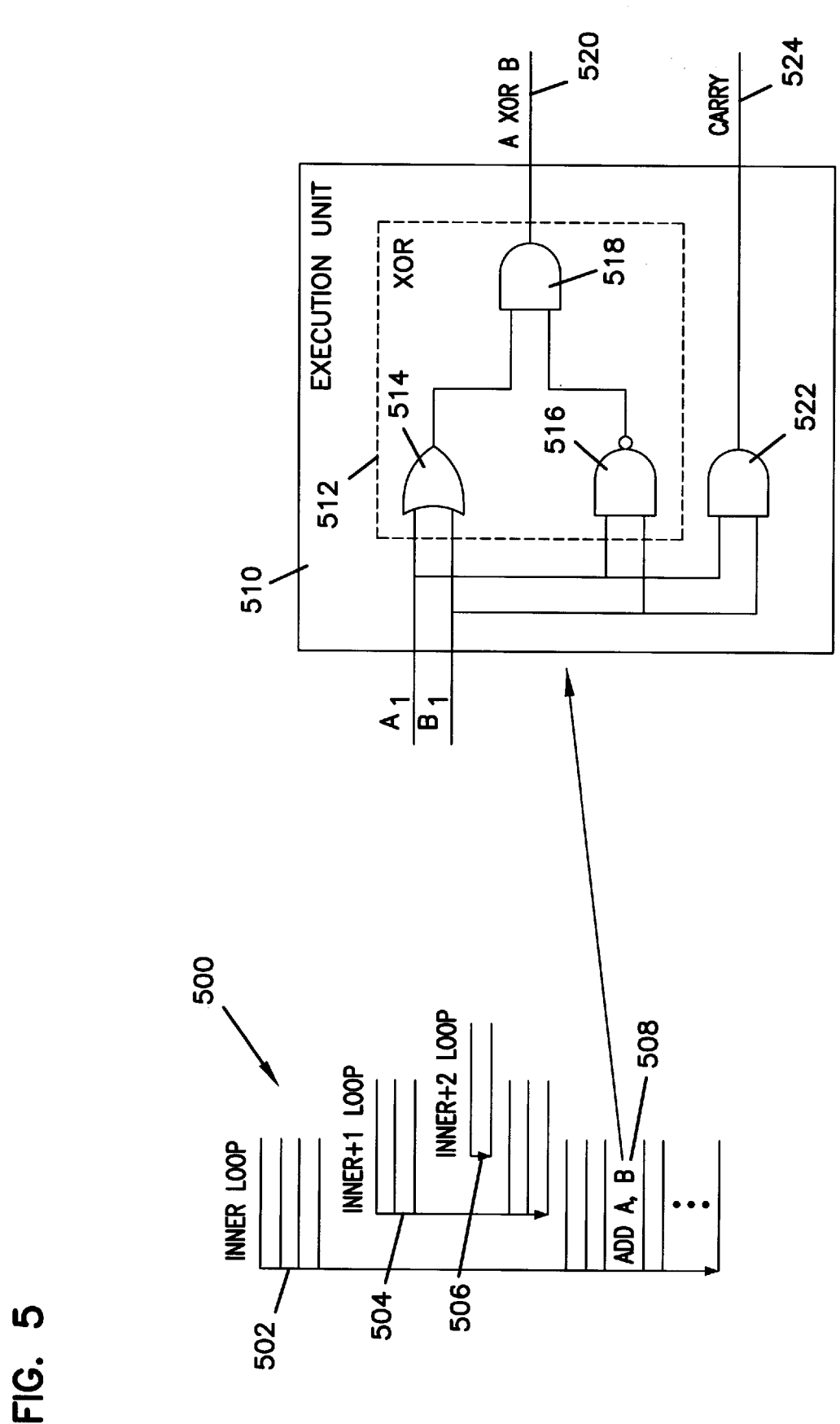
FIG. 5 illustrates one embodiment of the transformation of a selected segment of a core software routine loop into a corresponding portion of the parallel execution module.

FIG. 5 illustrates one embodiment of a transformation of a selected portion of a core software routine inner loop into a corresponding portion of the parallel execution module. Most conventional general purpose computing systems are descendants of what is typically referred to as the von Neumann, or sequential execution, machine. On such a machine, a sequential program includes a sequential list of program instructions that are executed in the order of program presentation. The fundamental or "inner" loop in a program is sequentially executed in a continual loop. In conventional general purpose computers, the inner loop is formed from a predetermined, general instruction set. However, with general instruction sets, there is a limited ability to reduce the total number of instructions. Increasing the clock rate is one common manner in which execution speed is currently increased in general purpose computers. Memory caching functions are also commonly used to increase data throughput, but this introduces cache coherency complexities in parallel processing systems.

The present invention is capable of executing an entire core routine, such as the fundamental inner loop, in a single clock cycle. While various aspects of the present invention facilitate this objective in combination, FIG. 5 illustrates one of the constituent elements. This involves the translation of each software instruction into a corresponding hardware equivalent.

Referring to FIG. 5, the core routine 500 is illustrated having an inner loop 502, and possibly one or more additional nested routines or loops. For example, first and second nested core routine levels are illustrated in FIG. 5 as the inner+1 loop 504 and the inner+2 loop 506. One representative software instruction is an addition instruction, labeled ADD A,B 508. This instruction is transformed into a hardware execution unit 510 that performs the desired mathematical function. The inputs $A_1$ and $B_1$ in this example represent two corresponding bits of the n-bit variables A and B to be added together. Analogous parallel execution units would add the remaining bits of the A and B variables.

$A_1$ and $B_1$ are input into an exclusive-OR (XOR) module 512 which includes an OR-gate 514, aNAND-gate 516 and an AND-gate 518 to produce the sum on output line 520. Where both $A_1$ and $B_1$ have binary 1 values, AND-gate 522 produces a carry signal on line 524 to the next level execution unit (not shown). As will be described in further detail below, the bussing architecture in one embodiment of the present invention utilizes non-multiplexed, non-interleaved, dedicated signal paths to facilitate single-cycle execution. Where each of the instructions of the inner loop are similarly converted to parallel execution units, it can be seen that the entire functional algorithm embodied by the inner loop can be realized in hardware.

The multiple execution units aggregately reflect the functional algorithm, and in fact are dictated by the algorithm to execute in a single clock cycle. Inner loops and other core software routines associated with data-intensive applications are typically quite short, thereby making hardware implementation of the algorithm practicable. The particular algorithm dictates the content of the multiple execution units, as well as their interconnection. In some instances, the interconnection is effected through the use of a potentially deep data pipeline to account for timing considerations, as described in connection with FIGS. 6A, 6B and 6C below.

FIG. 6A illustrates an example core software routine that can be transformed in accordance with the present invention. The direct transformation of a functional algorithm can present intra-algorithm timing considerations which are managed in the present invention by way of a deep data pipeline.

By way of example, a functional algorithm 600 is illustrated as it would be implemented in software. Within this algorithm is a function 602 to determine a sum, referred to as SUM2 at line 604. This example function 602 includes two sub-functions, illustrated by line 606 and loop 608. The loop 608 is a control function that is effected through the use of functional execution units and corresponding control structure.

A software implementation of such an algorithm on a general-purpose computer would require that the instructions in the program be executed sequentially. This, coupled with the fact that execution of each instruction may require multiple clock cycles (e.g., address generation, fetch, execute, etc.), reveals that such an implementation may require tens, hundreds, or even thousands of clock cycles to execute a single pass of the algorithm even for a relatively small inner loop. For data-intensive applications where perhaps millions or billions of simulations (i.e., algorithm loops) must be performed, the execution time is unacceptable.

FIG. 6B is a block diagram of an example implementation of the function 602 in accordance with the present invention. Because the variable SUM2 of line 604 is dependent on the state of the variable SUM1, SUM2 cannot be calculated until the "do-loop" 608 has completed. In order to account for this dependency, a pipeline constructed of registers is utilized. Depending on the algorithm, this pipeline can be very deep. This does not substantially effect the performance of the processing system however, since the only time delay that occurs is during filling and draining of the pipeline. Once the pipeline is full, the processing system outputs simulation output on each clock pulse.

Algorithm sub-function 606 is performed by one of the functional execution units 610 in the system. Execution unit 610 receives as input variables A and B, and produces the first SUM1 iteration labeled $SUM1_{IN}$ on path 612. Input variables C and D are also concurrently input. FIG. 6C illustrates this timing, as variables A, B, C and D are provided at the triggering edge of clock pulse 614, and $SUM1_{IN}$ on path 612 occurs during the same clock pulse, slightly delayed due to propagation delays (propagation delay not illustrated).

Because variable D is to be added to SUM1 to produce SUM2, variable D must be delayed until the final SUM1 value is available. This is accomplished through a pipeline 616 of registers 618, 620, 622, the number of which depends on the control flow of the algorithm. In this particular example, the do-loop 608 includes three iterations (i.e., DO . . . I=1,3), which may be used in instances where the variable C changes on each clock cycle. Therefore, three registers are used to coordinate the timing of the generation of SUM2.

The $SUM1_{IN}$ signal on path 612 is provided to a hardware control structure 624 which performs the do-loop 608. Various sub-functions are performed as part of the do-loop 608, including an addition sub-function (SUM1=SUM1+C), and a comparison sub-function to determine whether the loop has been executed the requisite number of times. Because the variable C changes on each of the three clock cycles (i.e., three consecutive memory cycles provide three different values of C), this sub-function requires three clock cycles to completely execute. This is illustrated in FIG. 6C, where the variable C changes on each of the triggering clock pulses 626, 628 and 630. Also, on the occurrence of each of the clock pulses 626, 628 and 630, the variable D propagates through the pipeline 616. At clock pulse 614, the variable D is passed through register-1 618 (stage-1), which in turn is passed through register-2 620 on clock pulse 628 (stage-2), and finally passed trough register-3 622 on clock pulse 630 (stage-3). The $SUM1_{OUT}$ signal on path 632 is not provided to the execution unit 636 until the triggering edge of clock pulse 630 occurs, due to the three-stage do-loop 608. Similarly, the variable D is not provided on path 634 to the execution unit 636 until the triggering edge of clock pulse 630 occurs, due to the three-stage pipeline 616. Therefore, the $SUM1_{OUT}$ signal on path 632 and the staged variable D on path 634 reach the execution unit 636 during the same clock period, and SUM2 is executed and produced at the output of execution unit 636 on path 638. Once the pipeline 616 is full, a new SUM2 will be produced on each occurrence of a clock signal. Similar executions are carried out for each portion of the algorithm, ultimately resulting in an output of an entire algorithm loop on each clock cycle. Once full, the pipeline remains full, and is as deep as required to produce an algorithm output on each clock cycle.

It should be understood that each stage of the pipeline can include numerous execution units operating in parallel in any given stage of its respective pipeline. From the foregoing description it can be seen that the use of multiple execution units, in connection with a pipeline structure having a depth corresponding to the number of dependency "wait states", results in an architecture capable of providing a computed output from one loop of the functional algorithm on each clock cycle. Therefore, various pipeline fragments associated with different execution units are themselves arranged in series, and in parallel, with other pipeline fragments to provide a complete pipeline structure that is full-width (i.e., allows all execution units to function in parallel), and that is full-depth (i.e., pipelined from front to back to facilitate single-cycle execution when the pipeline is full). It should also be understood that the particular functions and sub-functions are dictated by the functional algorithm, and therefore the chosen function and sub-functions of FIGS. 6A, 6B and 6C are presented for purpose of example only, and the invention is not to be limited thereto.

Figure 7:
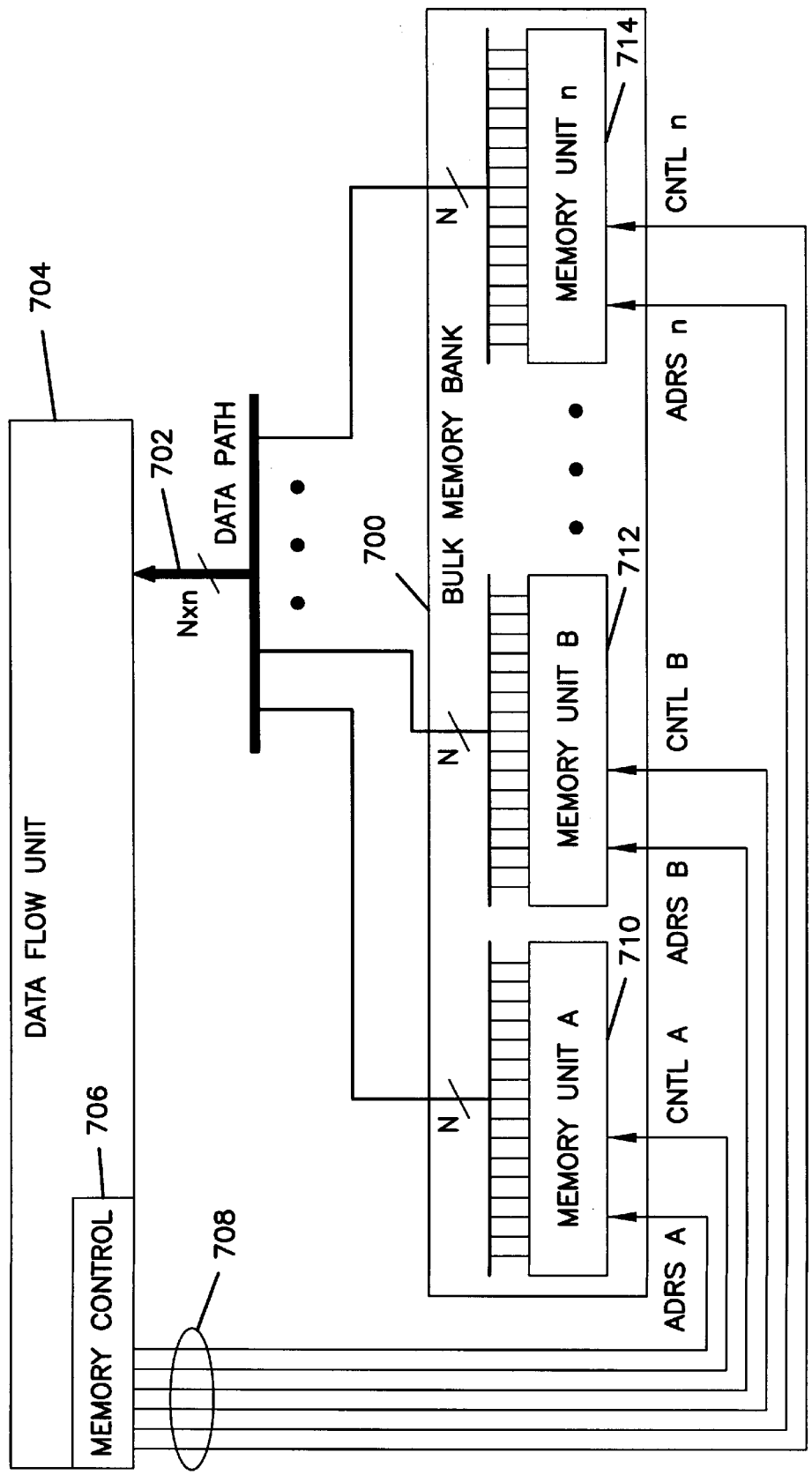
FIG. 7 is a block diagram of one embodiment of a memory bank and corresponding data path associated with the processing architecture.

Referring now to FIG. 7, a block diagram of an example memory bank 700 and corresponding data path 702 is provided. As previously described, the data flow unit (DFU) 704 includes memory control 706 to provide control signals to the memory bank 700. The control paths 708 carry the control signals to the memory bank 700, which may include multiple discrete memory units, such as memory unit A 710, memory unit B 712 through memory unit n 714. Depending on the algorithm, a certain data width will be necessary to carry out a complete pass of the algorithm in one clock cycle, which dictates the width of the data path 702. Depending on the data output width of the selected memory units, one, two or more memories can be arranged in a parallel fashion to accommodate the required data width. In the example of FIG. 7, each memory unit 710, 712 . . . 714 has a 16-bit data output. If the algorithm requires 30 data signals, then four 16-bit memory units are coupled in parallel to create the data path.

The control paths 708 are illustrated as individual paths each directly coupled to a particular memory unit. Address and control information is provided by the memory control 706 to the memory units via the control paths 708. It should be recognized that a common data burst starting address, and/or common control signals can be provided to all (or selected ones) of the memory units if the memory units are operating entirely symmetrically. For example, if each memory unit is to burst the same number of bytes from the same address, one address and one burst control signal can supply each of the memory units.

Figure 8:
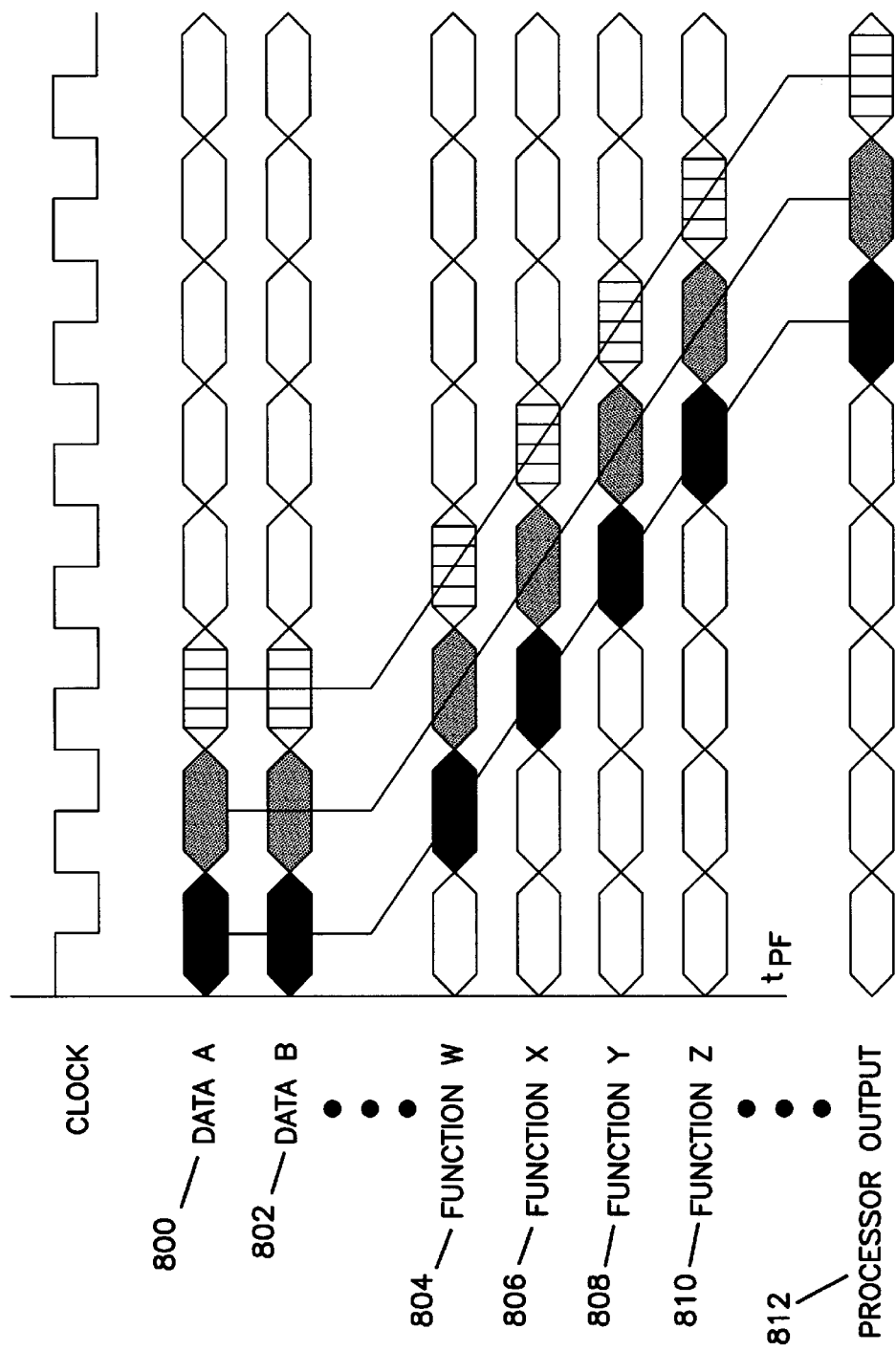
FIG. 8 is a mock timing diagram representative of the sustained, fully-pipelined execution attainable with the present invention.

FIG. 8 is a mock timing diagram representative of the sustained, fully-pipelined execution attainable with the present invention. The diagram is provided to illustrate that once the deep pipeline is filled at time $t_{PF}$ (time=pipeline full), every data input, every function and sub-function, and every control structure is executing on every clock cycle. There are no latencies or other delays involved. For example, on each triggering clock pulse, the data path presents a new burst of data, as illustrated by two of the data signals, Data A 800 and Data B 802. The data may be processed through a series of functions, labeled Function W 804, Function X 806, Function Y 808, and Function Z 810. For purposes of illustration, it is assumed that each of these functions are dependent on pipelined inputs each having a one-clock-cycle dependency. This results in Data A 800 and Data B 802 being processed at the next clock pulse for each of the stage-dependent functions. The processor output 812 is provided a number of clock cycles later, depending on the depth of the pipeline dictated by the algorithm. For each group of data provided on the data path, the processor output therefore represents a completed algorithm output on each clock cycle, thereby providing sustained peak performance.

Figure 9:
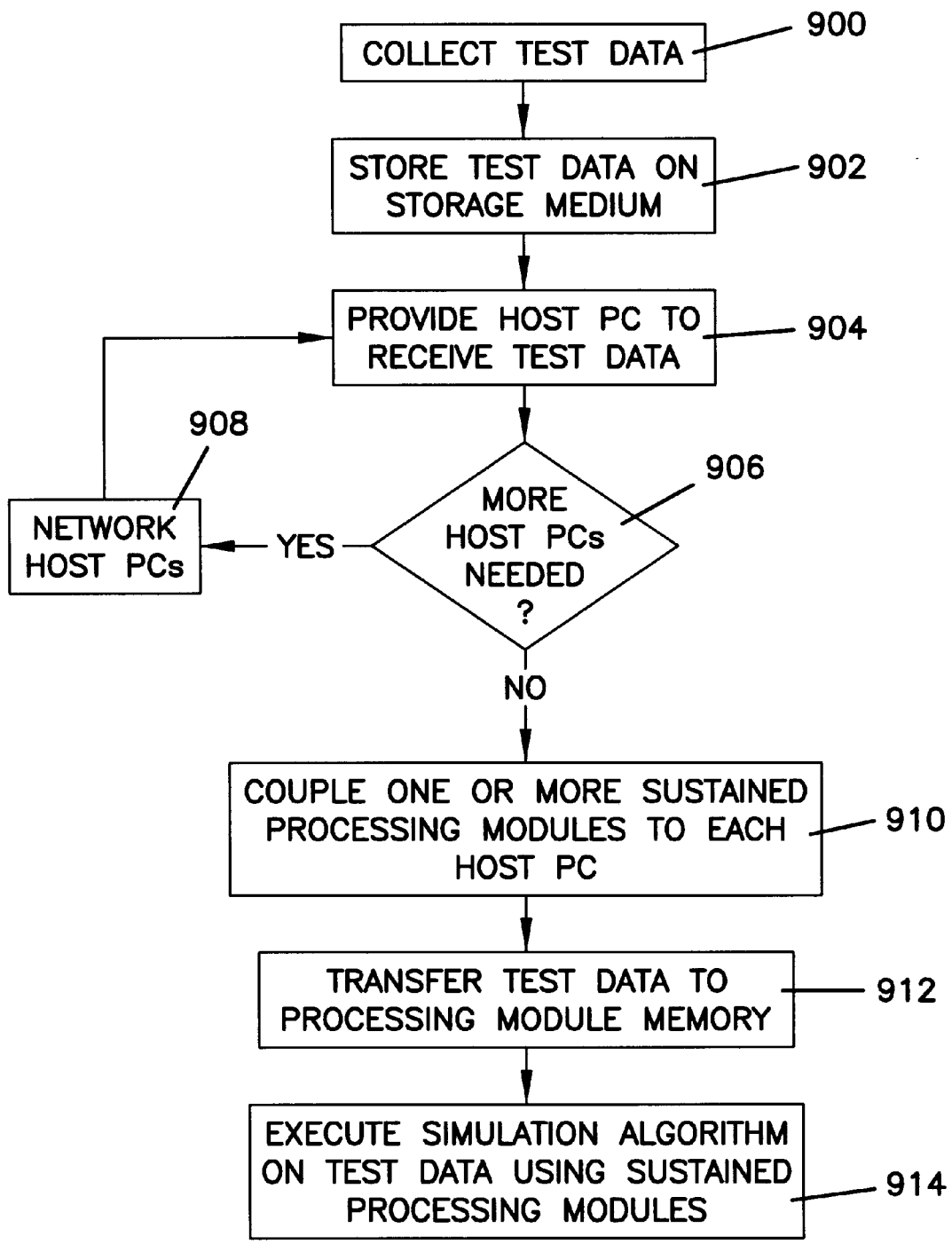
FIG. 9 is a flow diagram illustrating one exemplary manner in which the present invention may be employed.

FIG. 9 is a flow diagram illustrating one exemplary manner in which the present invention may be employed. This process is particularly advantageous in situations where data-intensive computer applications are required. For example, scientific testing and simulation often requires the collection of extremely large volumes of test data, which thereafter must be processed by an algorithm to arrive at a conclusion to which the voluminous data suggests.

In this exemplary embodiment, test data is collected 900. The test data is stored 902 on storage media. Alternatively, the test data can be directly transmitted rather than first stored on the storage media. A host PC is provided 904 to receive the test data that has been collected. If the test data is a particularly large volume of data, it is determined 906 whether more host PCs are needed. If so, more host PCs may be added, and can be arranged in a networked configuration as seen by block 908. When all host PCs have been provided, one or more sustained-execution processing modules in accordance with the present invention are provided in each of the host PCs, as seen at block 910. The test data is transferred 912 from the host PCs to the memory in the processing modules. When the memory within the processing modules have received the test data, the algorithm is executed 914 by the sustained-execution processing modules.

The transformation process itself is best illustrated by examples. FIG. 10 represents a software routine 1000 programmed to calculate the maximum, minimum, root-mean-square (RMS) and average values in a sequence of numbers. Assignment of data types and initialization of variables can be seen at program segments 1002 and 1004 respectively. The main or "inner" loop of the routine is represented by program segment 1006, and includes two sub-loops 1008 and 1010. Mathematical calculations are carried out at program segments 1012, 1014, 1016 and 1018. FIG. 10 is to be referenced in connection with the following flow diagram of FIG. 11.

Figure 11:
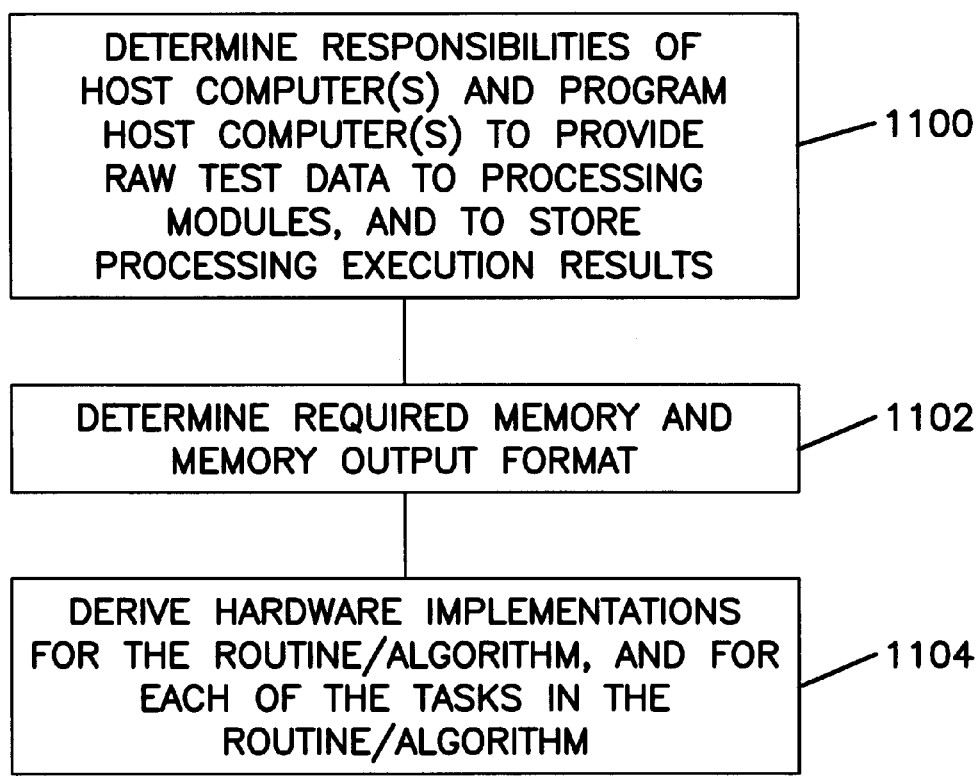
FIG. 11 is a flow diagram illustrating an exemplary process for carrying out transformations of an algorithm or software routine.

FIG. 11 is a flow diagram illustrating an exemplary process for carrying out transformations of an algorithm or software routine as described in connection with FIG. 10. First, the responsibilities of the one or more host computers is determined 1100, and the host computers are programmed to provide raw test data to the processing modules, and to store processing execution results. The host computer may be programmed to perform additional tasks if it is not economical to include dedicated hardware in the processing module to accomplish these additional tasks. For example, the host PC can write to particular registers in the processing module, such as to initialize the COUNT, MIN, MAX values, and can initialize hardware by clearing SUM and RMSSUM, setting I=1, etc. In the example given, the host processor could also perform the final generation of AVG and RMS, as they are relatively simple calculations and only performed once. In such cases, although possible, it is not economical to provide this functionality in the processing module of the present invention.

Figure 29:
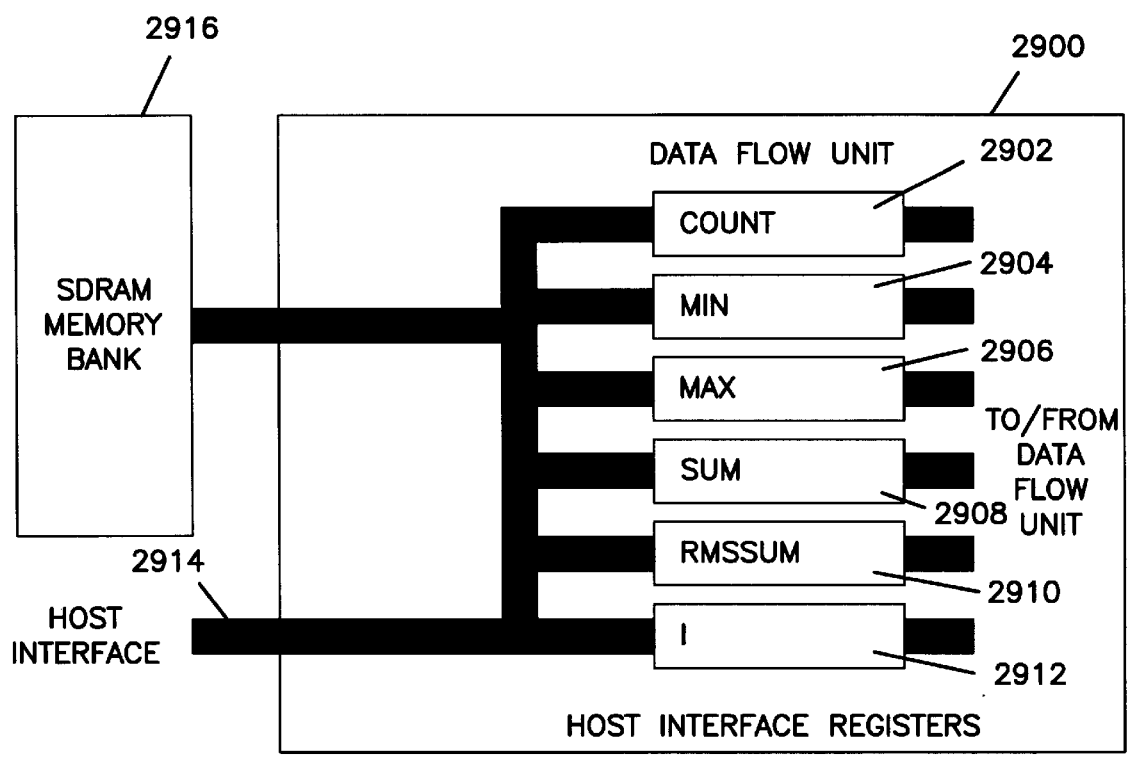
FIG. 29 illustrates an example of a data flow unit including host interface registers capable of being loaded by the host computer.

FIG. 29 illustrates an example of a data flow unit 2900 including host interface registers 2902, 2904, 2906, 2908, 2910, and 2912. These registers can receive the constants/variables COUNT, MIN, MAX, SUM, RMSSUM and I using the host interface 2914 and the memory bank 2916. These constants/variables can then be accessed as part of the normal operation of the data flow unit 2900. This provides a great deal of flexibility to reset variables, and modify constants if desired, without requiring hardware implementation. The use of a host interface for this purpose does not adversely affect the desired speed of the inventive system, since these constants/variables need only be loaded once prior to execution of the algorithmic loop.

Retuning again to FIG. 11, the requisite amount of memory and the memory output format is then determined 1102. In the example of FIG. 10, there is only one array read per iteration of the inner loop, although it is referred to seven times. Therefore, only one memory bank is required in this example.

At this point, hardware implementations for the algorithm and each of the individual tasks within the algorithm (i.e., sub-functions) are derived 1104. To illustrate, the nested loop 1008 is analyzed is analyzed in connection with FIGS. 12–17.

Figure 12:
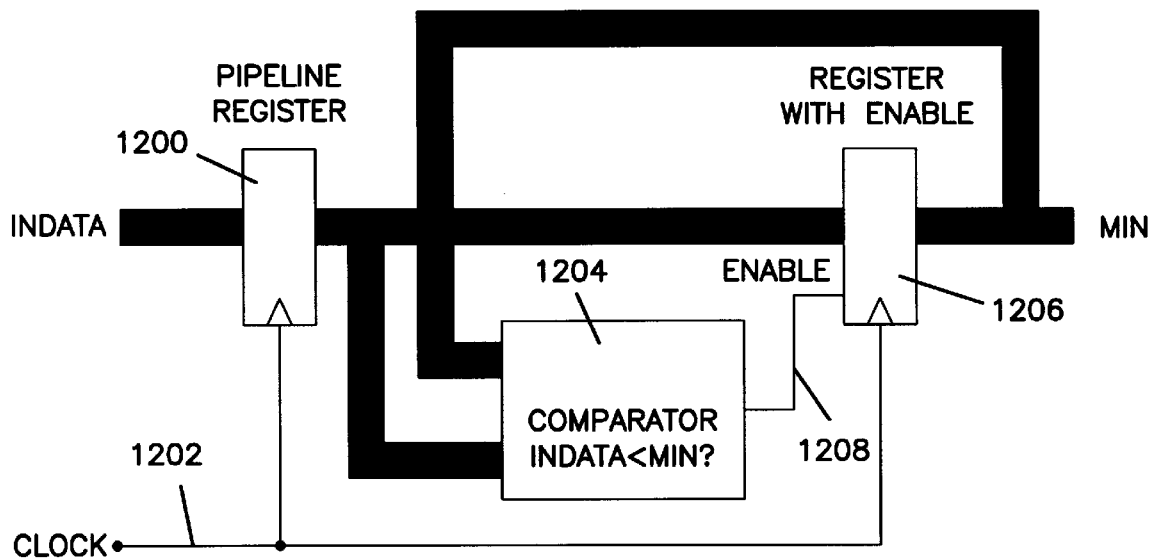
FIGS. 12, 13 and 14 illustrate various approaches to transforming a software conditional statement into hardware.
Figure 13:
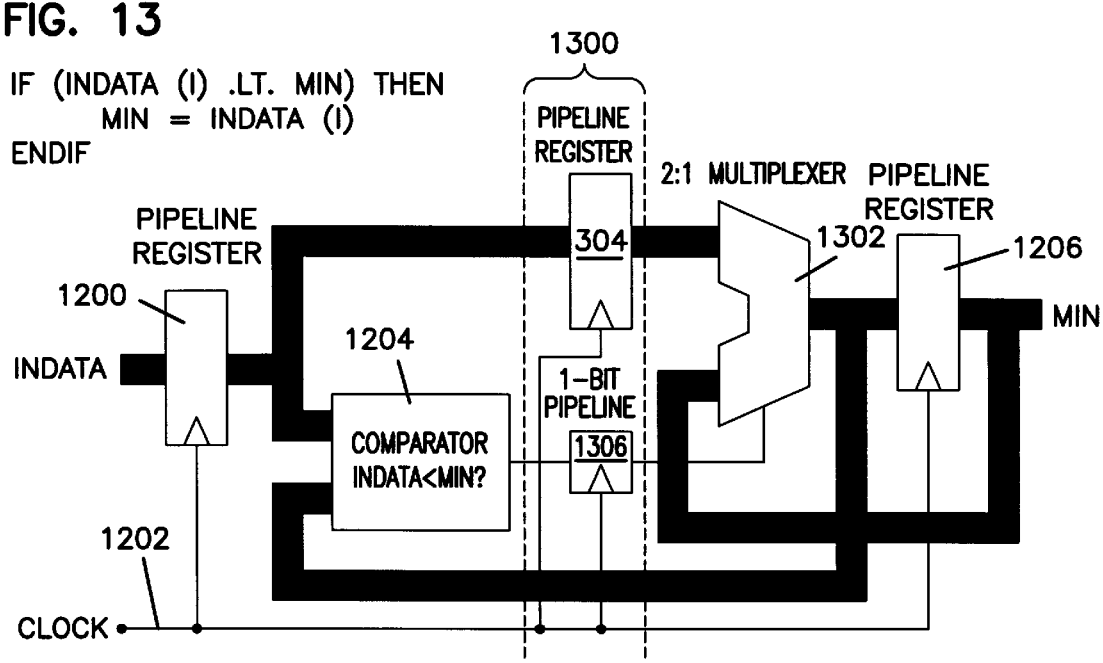

FIG. 12 illustrates one approach to transforming a software conditional statement into hardware. In this embodiment, the data is registered at register 1200, and on the next occurrence of the clock signal (path 1202), the data is provided to the comparator 1204 and to register 1206. Register 1206 stores the last MIN value entered at the last clock pulse. The current MIN value at the output of register 1206 is also fed back to an input of the comparator 1204, so that the current MIN value is compared to the new data from the register 1200.

A hardware comparison of INDATA(I) and MIN results in a "true" or "false" enable signal on path 1208. If the enable signal reflects a "true" condition, the variable MIN is updated in the register 1206. This transformation illustrates an example of the pipelining implemented in accordance with the present invention. In a first clock cycle, INDATA(I) is provided to the comparator 1204 where it is compared with MIN, and the result of the comparison is latched in register 1206 on a second clock cycle. As can be seen in FIG. 12, the nested loop itself is transformed into hardware. To update the register 1206 in the same clock cycle in which the comparison is performed (thereby not requiring pipeline stages) requires that the comparison be performed quickly enough to meet the required enable signal setup time of the register 1206.

Figure 14:
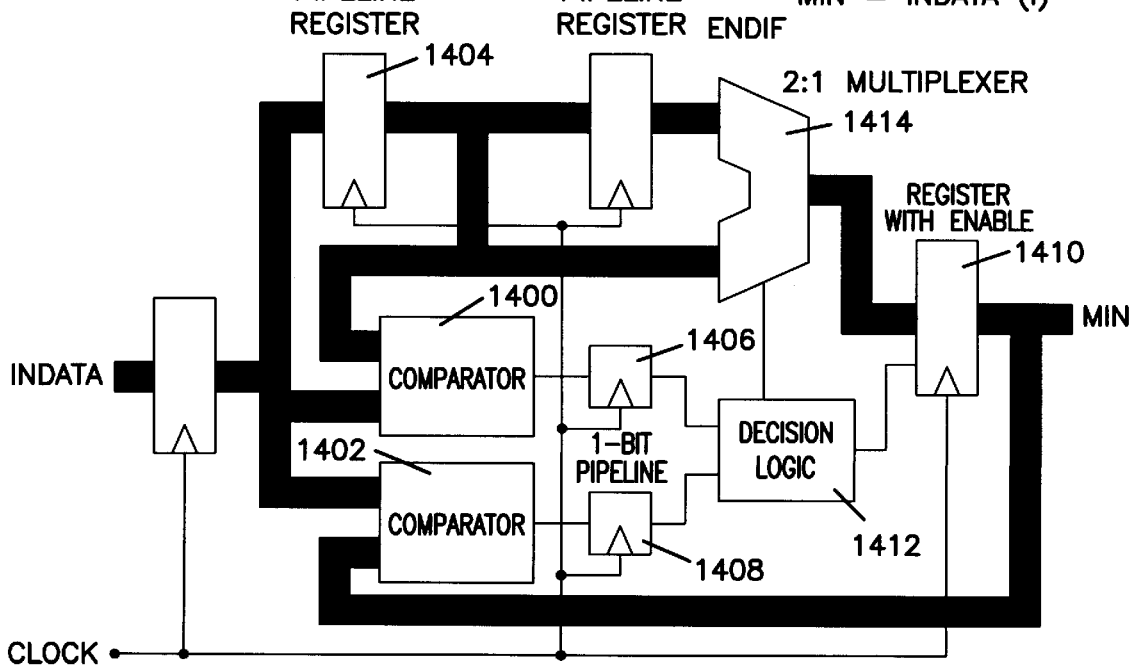

In the pipelined case, a comparison of INDATA(I+1) and the minimum value "so far" is performed in the second clock cycle. The minimum value "so far" might be in MIN, or might be in the pipeline register, depending on the value of the condition. The configuration illustrated in FIG. 13 can be used in this situation. An additional pipeline stage 1300 and a multiplexer 1302 is utilized. The inputs INDATA are provided to the comparator 1204 from register 1200. The multiplexer 1302 selects either MIN at the output of register 1206, or the pipeline register 1304 output, depending on the condition value supplied by the comparator 1204 via the bit pipeline 1306. The multiplexer 1302 also provides the means to selectively update register 1206, and thus there is no additional complexity.

Where higher speed is required, two comparisons can be performed in parallel. This embodiment is illustrated in FIG. 14, where two comparators 1400, 1402 perform comparisons in the first clock cycle: (INDATA(I) .LT. MIN) and (INDATA(I) .LT. INDATA(I−1)), where INDATA(I−1) is the pipelined copy of INDATA(I) from pipeline register 1404. Both condition codes are latched as well, as INDATA(I) and INDATA(I−1) in bit latches 1406 and 1408.

In the second clock cycle, the MIN value at the output of register 1410 is updated taking both condition codes into account at the decision logic 1412. The decision logic 1412 provides both the selection signal to the multiplexer 1414, and the enable signal to register 1410. Analogous circuitry can be implemented to calculate the MAX value.

Figure 15:
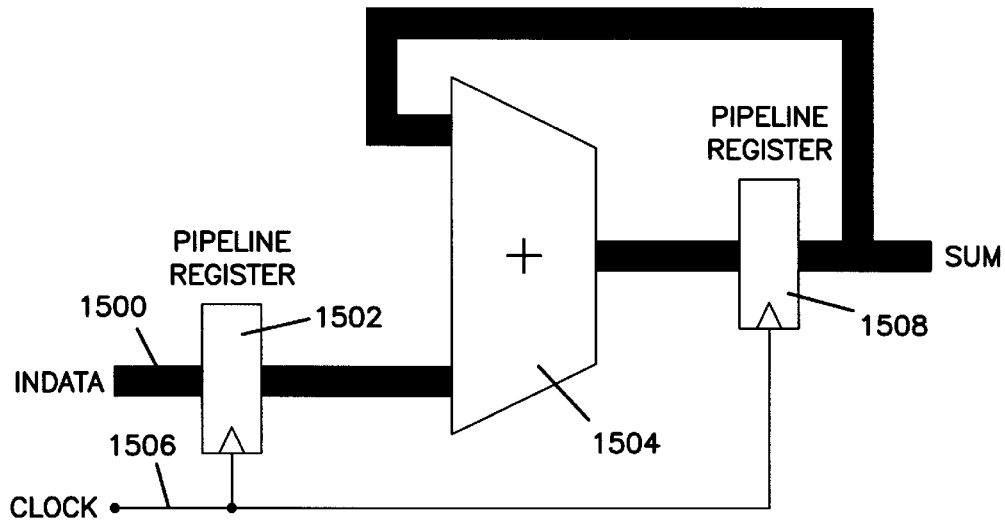
FIGS. 15 and 16 illustrates different approaches to transforming a software mathematical function into hardware.

FIG. 15 illustrates one approach to transforming a software mathematical function into hardware. The statement SUM=SUM+INDATA(I) can be transformed to hardware as illustrated. The INDATA(I) on input path 1500 is provided to register 1502, and input to the adder 1504 when the clock signal on path 1506 activates the register 1502. The adder output is staged at register 1508, the output of which is the SUM. The current value of SUM is fed back into the adder to accomplish the desired addition function. This addition takes only one pipeline stage.

Figure 16:
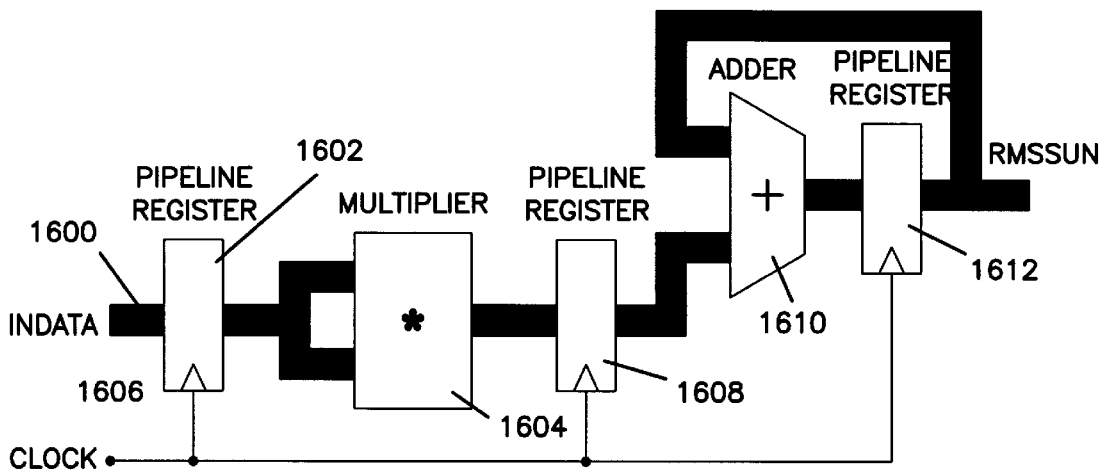

FIG. 16 illustrates one approach to transforming a software mathematical function, including an addition and a multiplication, into hardware. The statement RMSSUM =RMSSUM+INDATA(I)*INDATA(I) can be transformed to hardware as shown. The INDATA(I) on input path 1600 is provided to register 1602, and input to the multiplier 1604 when the clock signal on path 1606 activates the register 1602. In each cycle, the new INDATA value is therefore multiplied by itself, and the product is saved in the register 1608. The multiplier 1604 output is staged at register 1608. The register 1608, adder 1610, and register 1612 correspond to the previous description of register 1502, adder 1504 and register 1508 of FIG. 15. As can be seen, this function requires two pipeline stages.

Figure 17:
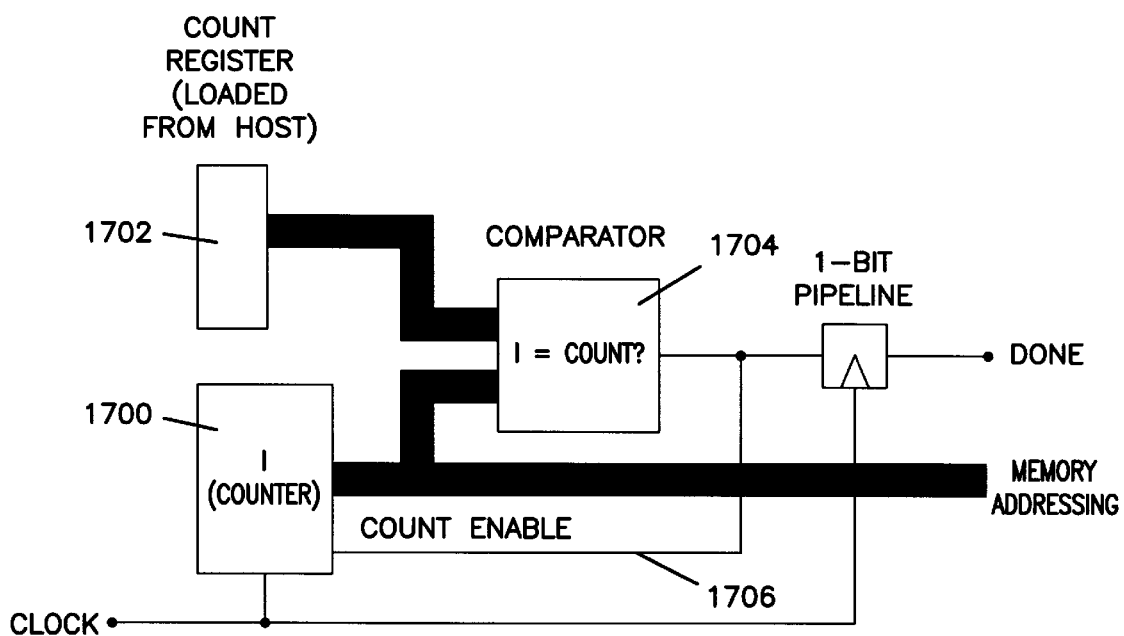
FIG. 17 illustrates one approach to transforming a software loop construct, such as the main inner loop construct, into a hardware control structure.

Finally, the entire loop 1006 of FIG. 10 must be transformed. FIG. 17 illustrates one approach to transforming a software loop construct into a hardware control structure. The software loop construct is identified as DO 100 I=1, COUNT. The variable I is stored in a counter 1700, which is incremented in each clock cycle and compared with the value COUNT. The value COUNT is stored in a register 1702, that can be progammably updated by the host computer. Alternatively, the COUNT can be hardwired to always provide a predetermined count. The comparator 1704 compares the variable I with the COUNT, and when unequal, the comparator 1704 provides a count enable signal to the counter 1700 via path 1706. When I is found to be equal to COUNT, the count enable signal is disabled, and the DONE signal indicates completion of the do-loop 1006. In one embodiment, the DONE signal is provided to the processing module's associated host PC (see FIG. 1), using a signaling technique, interrupt signal, or the like. This terminates processing of the algorithm when the desired number of simulations has been accomplished.

The sample transformation of FIGS. 10–17 provides an example of how a particular computer program loop or algorithm can be implemented in hardware in accordance with the present invention. The following description provides more general transformation rules that are useful in practicing the invention, and provides some additional tools to make and use a sustained-execution processing architecture given a particular algorithm. For purposes of illustration, the following examples will primarily be described in terms of an algorithm that is typically realized using a sequential computer program, similar to the program described in connection with FIG. 10. For purposes of further example, it will be described how an "inner loop" of a sequential computer program can be transformed into a sustained execution processor in accordance with the invention. The description, including FIGS. 18–29, is therefore illustrative of a transformation of a computer program or inner loop into a sustained, peak performance processing architecture; however the present invention is not to be limited thereto.

Figure 18:
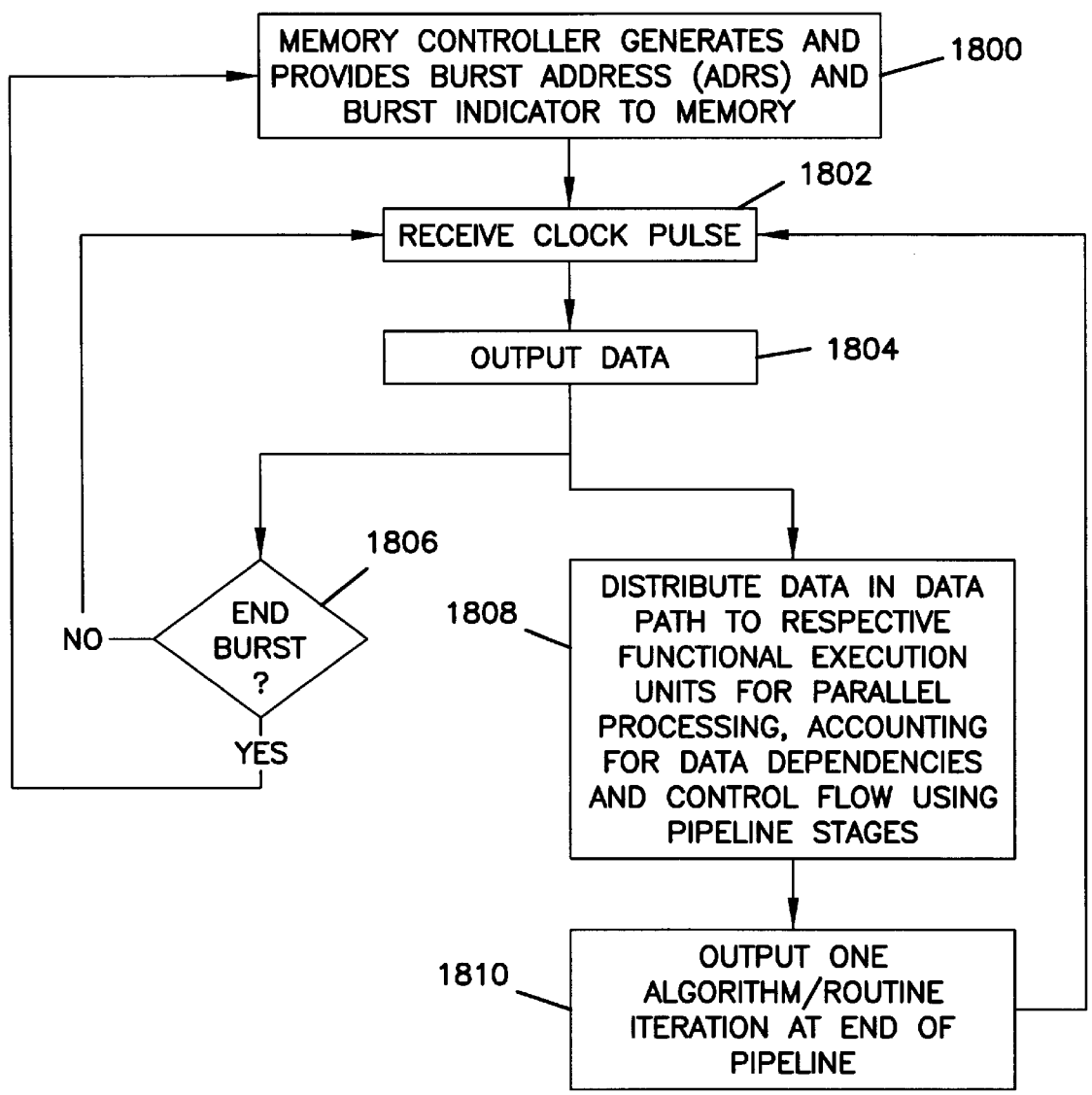
FIG. 18 is a flow diagram of a method for providing single-cycle execution of an algorithm in accordance with the present invention.

Referring now to FIG. 18, a flow diagram of a method for providing single-cycle execution of an algorithm is provided. In this embodiment, a memory controller generates 1800 a burst address (ADRS) and a burst indicator (CNTL). The ADRS and CNTL signals are provided to a bulk memory that can operate in a data burst mode. Upon receipt of a clock pulse 1802, the memory transmits 1804 X bits of data in parallel, beginning at an initial burst address. The number of bits transmitted is dictated by the number of bits required by one loop of the algorithm. The memory controller tracks the number of X-bit words that have been transmitted during a particular data burst, and determines whether the end of the burst has been reached as seen at decision block 1806. If the data burst has not reached its end, processing returns to block 1802 where the memory controller awaits another clock pulse to output another X-bit data word. If the burst has completed, processing returns to block 1800 where the memory controller generates a new burst address and burst indicator, and provides the new ADRS and CNTL to the memory device.

Concurrent with the memory controller operation, the data is distributed via discrete transmission paths to the data flow unit and parallel execution units, as seen at block 1808. The data is preferably distributed in a non-multiplexed, non-interleaved fashion to facilitate single-cycle execution. Data dependencies dictated by the expression evaluation and control flow of the algorithm are accounted for using a fully-pipelined distribution path. Again, this facilitates single-cycle execution of the algorithm. Once the pipeline is full, one algorithm iteration is output from the processing module on each clock cycle, as indicated at block 1810. Where the algorithm does not require pipelining, it can be seen that an algorithm output would also be provided in each clock cycle, the difference being that the data output from the memory would immediately be acted upon and output (i.e., data would not be "staged" throughout the data flow unit and parallel execution module). Subsequent algorithm outputs are provided upon the occurrence of subsequent ones of the clock pulses 1802.

Figure 19:
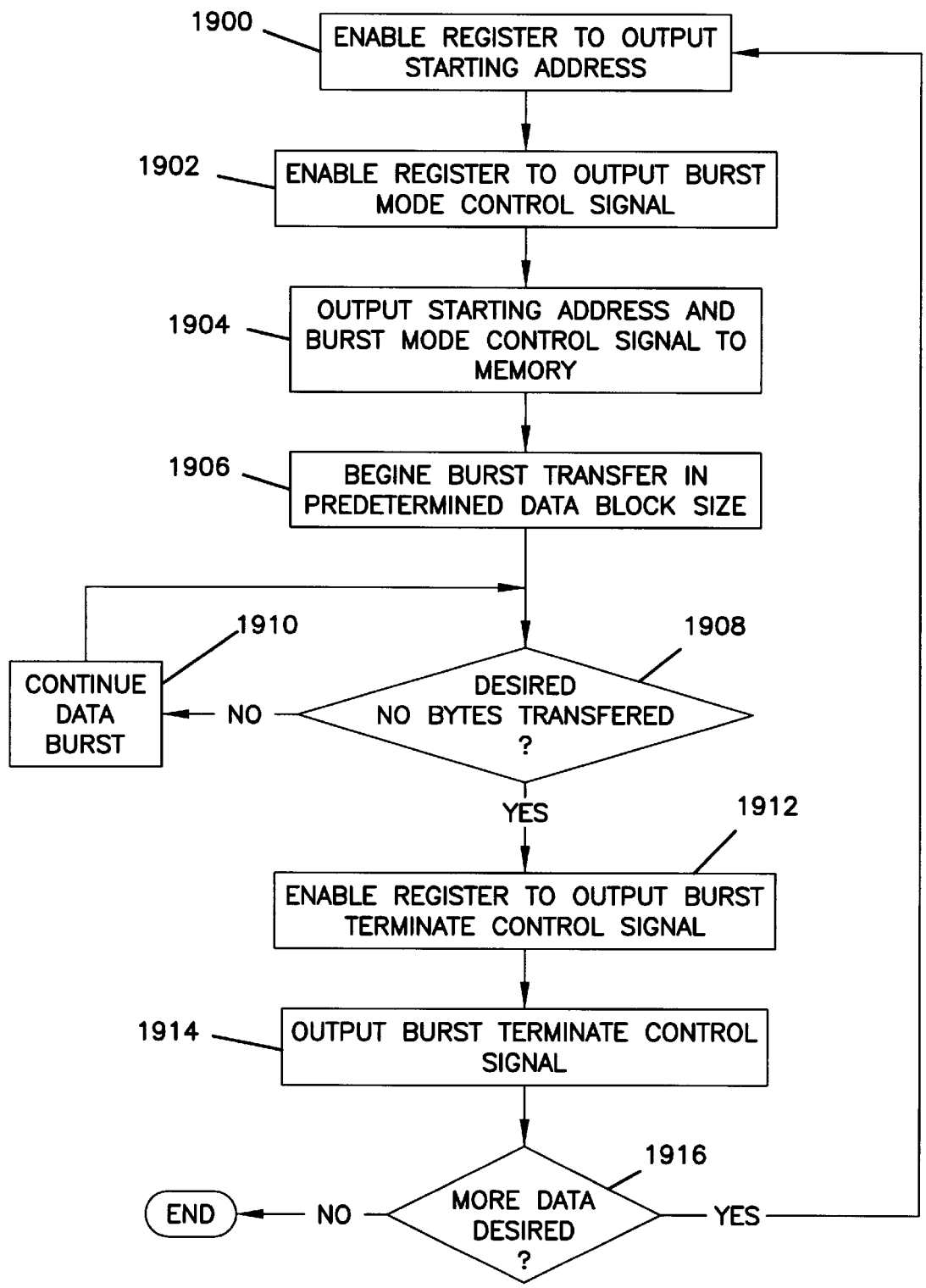
FIG. 19 is a flow diagram illustrating one embodiment of a method for controlling memory bursts in accordance with the invention.

FIG. 19 is a flow diagram illustrating one embodiment of a method for controlling memory bursts. A first register (or alternatively an external memory/cache) is enabled 1900 to output a starting address of the data burst. A second register (or alternatively an external memory/cache) is enabled 1902 to output burst mode control signals, such as a control signal indicating to the memory that a burst transfer is desired. Alternatively, the memory control inputs may be hardwired to initialize in a burst mode. The starting address and burst mode control signals (if any) are output 1904 to the memory, preferably via dedicated, non-multiplexed transmission paths to facilitate single-cycle execution. The burst transfer is thereafter initiated 1906, triggered by a clock pulse. In one embodiment of the invention, the burst mode is effected by signaling to the memory that a full-page burst is desired, wherein a burst terminate signal is provided to terminate the burst after the desired number of bytes have been transmitted. In this embodiment, the burst transfer of a predetermined size is initiated, although it may be terminated prior to reaching the predetermined data block size. Alternatively, memory devices which accept desired burst length inputs can be controlled by the memory controller CNTL signals, where the desired burst length is directly provided to the memory.

In any case, it is determined 1908 whether the desired number of bytes have been transferred. If not, the data burst continues 1910. Where a "burst terminate" is used, and the desired number of bytes have been transferred, a register is enabled 1912 to output the burst terminate control signal upon reaching the end of the data burst, and the burst terminate control signal is thereafter output 1914 upon the occurrence of the next clock pulse. Where no more data transfers are necessary as determined at decision block 1916 (e.g., the algorithmic simulation has completed), the process ends. Otherwise, memory control processing returns to block 1900 to initiate a new data burst.

Figure 20:
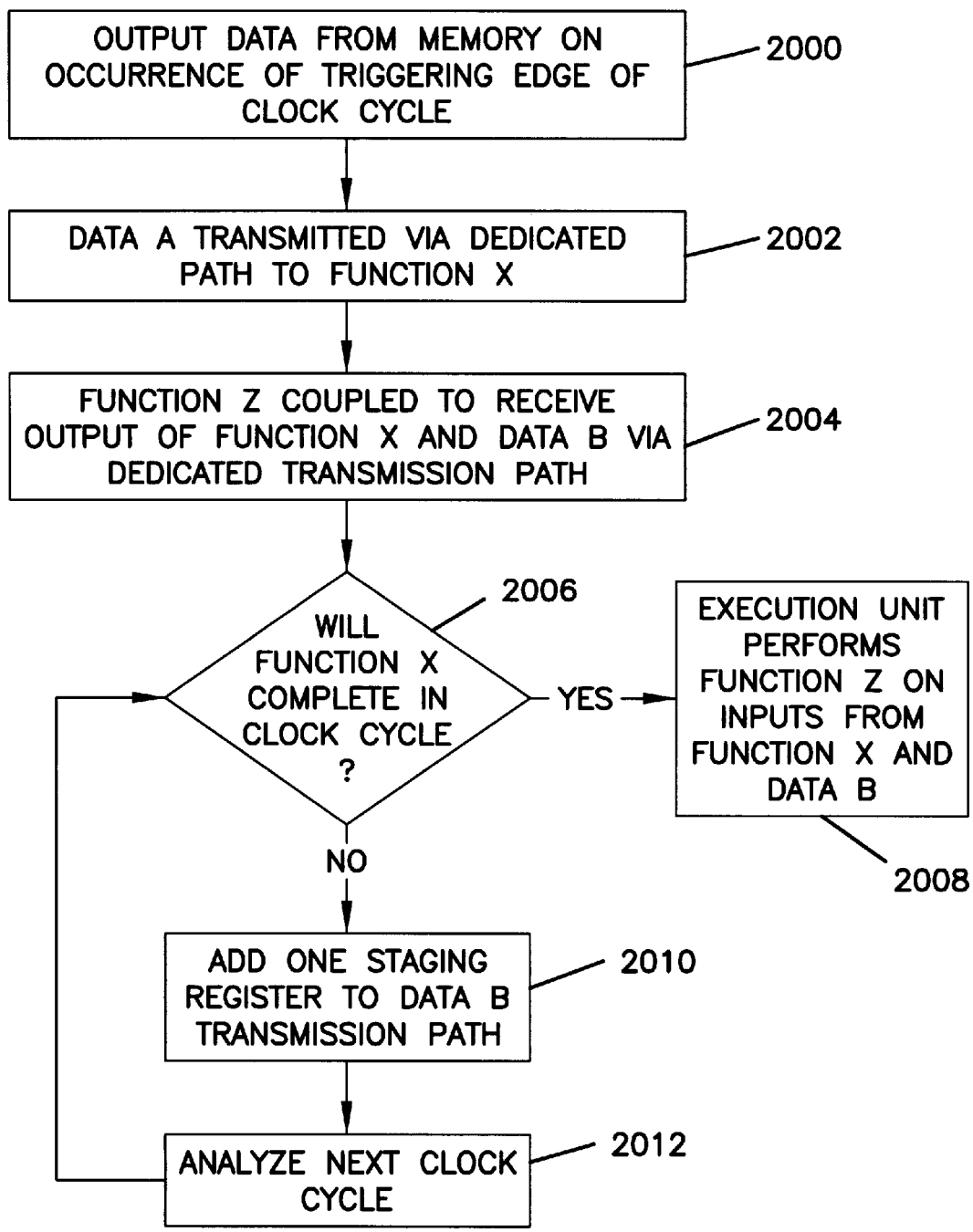
FIG. 20 is a flow diagram illustrating a exemplary design process for managing data flow synchronization issues.

Referring now to FIG. 20, a flow diagram illustrating a design process for managing data flow synchronization issues is provided. The analysis includes the output of data from memory on the occurrence of the triggering edge of a clock cycle 2000. For a given data flow, Data A may be transmitted 2002 via a dedicated path to a function X, as shown at block 2002. A function Z may be coupled to receive the output of function X and Data B via dedicated transmission paths, as seen at block 2004.

Given this information, it is determined 2006 whether the function X will complete during the current clock cycle. If function X does not include clocked components or registers, and the propagation delays and setup times are accounted for, the execution unit will perform function Z, as shown at block 2008. Otherwise, where function X cannot be completed during the current clock cycle, a staging register is added 2010 to the Data B transmission path. Similarly, the next clock cycle is analyzed 2012 to again determine whether the function X will be completed during that clock cycle. This process continues until the proper number of staging registers are added to the Data B transmission path. It should be recognized that this type of analysis can be performed on each function of the transformed algorithm to provide a fully-pipelined system.

The process of converting an algorithm from a sequential instruction format (expressed in a computer programming language) to an architecture in accordance with the present invention includes transformations from programming language constructs into hardware constructs and pipeline stages. These sub-units are hard-wired together to result in a hardware manifestation of the original algorithm which can output one iteration of the inner loop of the algorithm each clock cycle, or alternatively in a small number of cycles. The transformed algorithm can be represented by a data flow diagram.

Because the hardware design is a direct result of the original algorithm, there is no notion of "instructions" or "control flow" or "execution" in the conventional sense. Typical programming language constructs include unary and binary operators (arithmetic and Boolean) in expressions, constants, local and global variables, arrays, indexed location reads from arrays, variable assignments, indexed location assignments to arrays, conditional statements such as if-then-else and case statements, loop constructs such as for-loops and while-loops, and the like.

These typical programming constructs can be mapped onto hardware elements such as adders, subtractors, square root functions, comparators and other mathematical and binary units equivalent to unary and binary operators in a programming language. They can also be mapped onto hardware registers to account for constants and variables. Other hardware elements include external memory banks, ASICs, FPGAs, custom ICs, or a combination thereof, which can perform the functions of arrays in the programming language. Patterns of program array read functions can be mapped onto hardware reads from memory banks, external and internal caches (if applicable), and pipeline registers, as is similarly applicable for writes to hardware caches, pipelines, registers and external memory banks. Software conditional expressions can be mapped onto multiplexers which can select one of several possible values or actions according to the computed values of conditional expressions. Counters and control circuitry can be used to simulate the effect of loop constructs. Examples of such hardware mappings are described in greater detail in connection with the following diagrams.

If desired, certain additional software transformations may be performed on the original program to render it more suitable for conversion into hardware. Some of these are optimizations, such as loop-invariant code movement and strength reduction. Others include modifications to simplify or eliminate special-case calculations such as boundary conditions. As previously described, pipelines may also be required to ensure proper synchronization of intermediate results, as well as hardware to ensure the correct execution of boundary conditions that could cause the pipeline to be incorrectly filled.

The following sections provide general transformation rules as applied in the present invention, and further provides examples for various conventional programming language constructs.

Unary Operators

Unary operators accept a single input and produce a single output within a clock cycle (i.e., propagation delays) or may require additional clock cycles. Examples of unary operators include providing a negative value (unary minus), an absolute value, or the square root function. The absolute value function abs(a) is taken as an example. This function can be described as: If (a<0) then return (−a), else return (a). Various implementations are described below to illustrate the principles involved.

Figure 21:
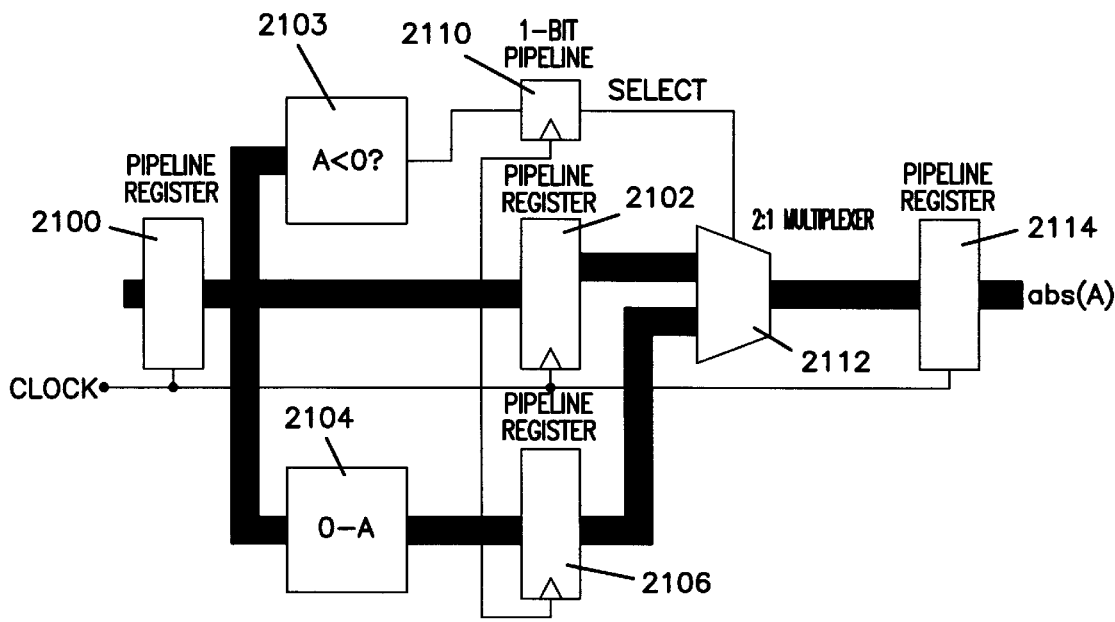
FIGS. 21 and 22 represent alternative embodiments of a unary operator transformation, particularly, an absolute value function.
Figure 22:
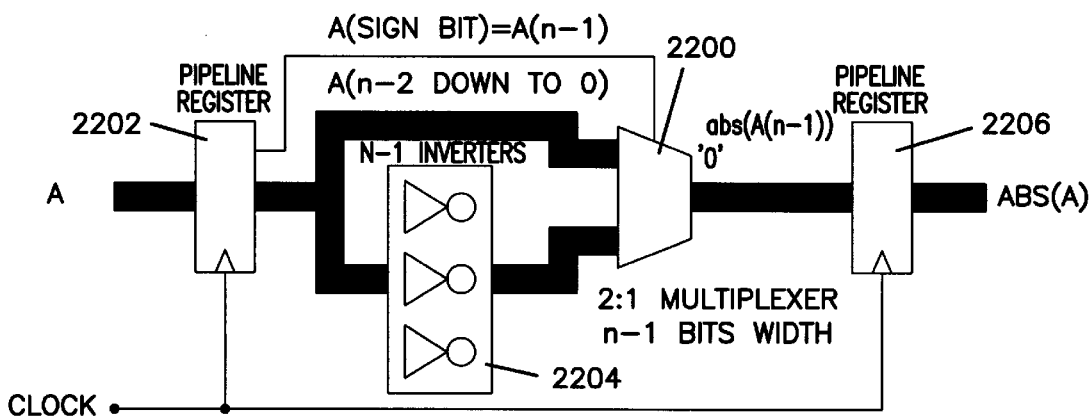

FIGS. 21 and 22 represent alternative embodiments of a unary operator transformation, particularly, an absolute value function. FIG. 21 illustrates a two-clock-cycle implementation. During a first clock cycle, Data A is transmitted from a register 2100 to register 2102 for use in a second clock cycle. A signed inversion of Data A is performed at block 2104, and stored in register 2106. The Boolean expression (A<0) is computed at block 2108, and stored in the 1-bit pipeline register 2110.

During the second clock cycle, the multiplexer 2112 selects the stored value A or −(A) depending on the result provided by block 2108 (stored in register 2110). Therefore, where Data A was originally negative, −(A) produces a positive A. The selected value is stored in register 2114. It should be recognized that during the second clock cycle, only the stored values from the first clock cycle in registers 2102, 2106 and 2110 are operated upon. Therefore, another absolute value operation can be concurrently operated on at blocks 2104 and 2108.

FIG. 22 illustrates a one-clock-cycle implementation of an absolute value function. This embodiment takes advantage of special information about the particular data formats employed. For example, in 2's complement format, the expression (A<0) reduces to the value of the most significant bit (MSB) or "sign bit". Where the MSB is binary 0, A is positive, and the input value of A is selected by the multiplexer 2200 as designated by the sign bit from the register 2202. Where the MSB is binary 1, it indicates that A is a negative number, requiring inversion 2204 of the remaining bits of A to produce the absolute value. Therefore the sign bit of "A" can be used to control the multiplexer 2200 to select between "A" or "not A" for every bit except the sign bit, which is hardwired to binary "0". The selected value is stored in register 2206. Provided that the delays through the inverters 2204 and the multiplexer 2200 are less than one clock cycle, a single-cycle implementation of abs(a) is realized.

It should be recognized that the particular implementation (i.e., the two-clock-cycle or the one-clock-cycle implementation) is essentially irrelevant due to the unique, fully-pipelined architecture of the present invention. This is because once the pipeline has been filled, an entire algorithm output is provided, regardless of how deep the pipeline is within the architecture. An insignificant and virtually undetectable time difference is present, however, during pipeline filling and emptying, due to extraneous staging registers.

Other unary operators are handled similarly, and some may require additional clock cycles. The square root function sqrt(), for example, may require several clock cycles.

Binary Operators

Figure 23:
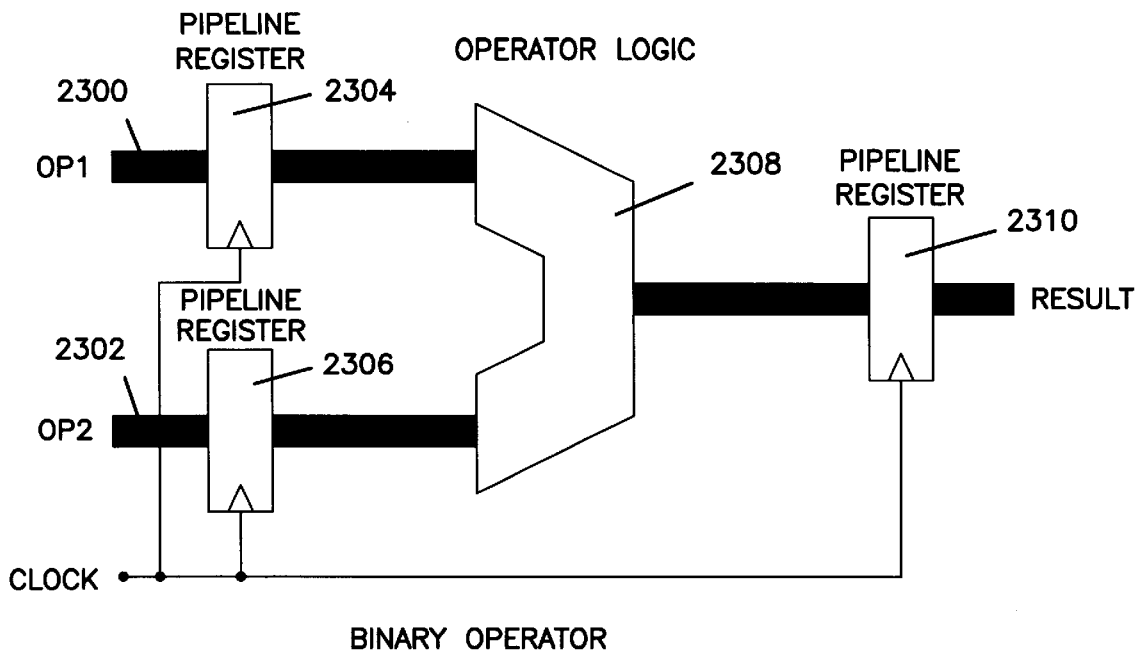
FIG. 23 is a block diagram of one embodiment of a binary operator transformation in accordance with the invention.

Binary operators accept a pair of inputs, and produce a single output within a clock cycle (i.e., propagation delays) or may require additional clock cycles. Examples of binary operators include addition, subtraction, multiplication, division, and other mathematical operations. Binary operators also include Boolean operators, such as AND, OR, XOR, NAND, etc. functions. Comparison operators also fall into the binary operator category, as a pair of data inputs may be received and compared, and a Boolean result is provided (e.g., equal to; less than or equal to, greater than, etc.). Because two inputs are required to produce one output, binary operators typically produce a narrowing of the pipeline. For example, FIG. 23 illustrates a binary operation having operator 1 input (OP1) at input 2300 and operator 2 (OP2) at input 2302. OP1 and OP2 are output from their respective registers 2304, 2306 to the binary operator logic 2308 where the binary operation occurs. The result can be stored in a single register 2310, thereby illustrating the narrowing of the pipeline.

Figure 24:
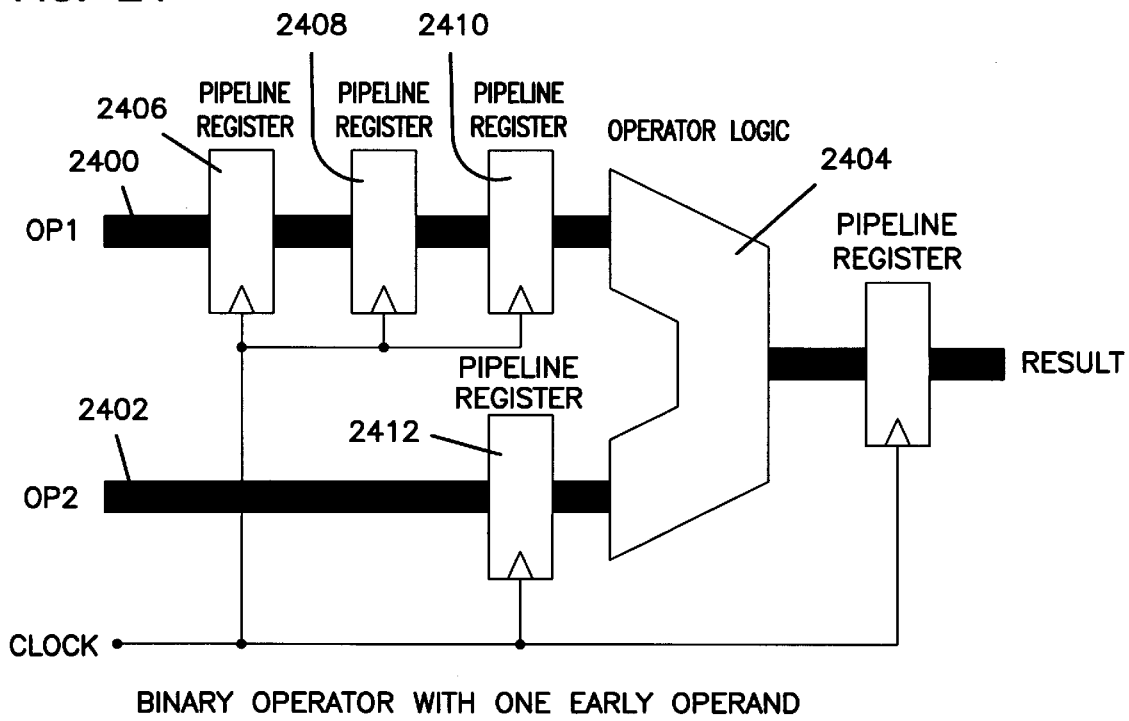
FIG. 24 is a block diagram of a binary operator transformation requiring input synchronization using pipeline registers.
Figure 25:
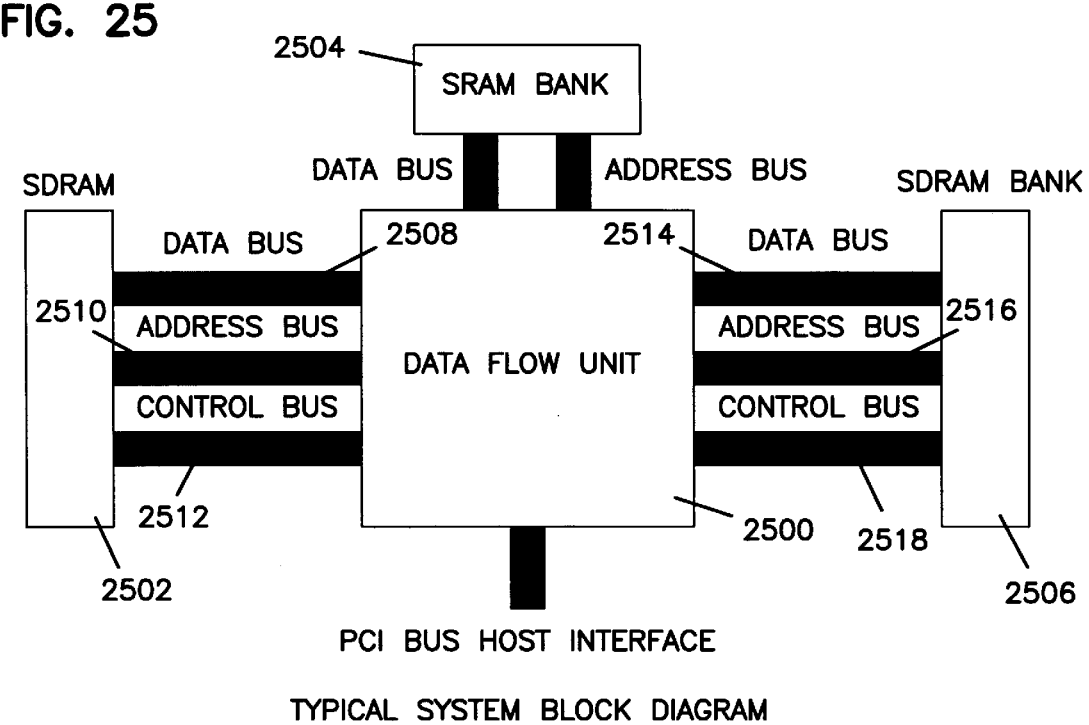
FIG. 25 illustrates the use of external, or auxiliary, memory components to increase the parallelism of the memory accesses.

However, because binary operations require two inputs, the binary operation cannot be performed until both of its inputs are available. If one is available prior to the other, the earlier input must be stored in a pipeline including n registers, where n is the number of clock cycles that will occur before the second input is available. This pipelining is illustrated in FIG. 24, where the OP1 input 2400 and OP2 input 2402 represent the inputs to the binary operator logic 2404. In this case, it is assumed that the OP1 input signal is available prior to the OP2 input signal, thereby requiring registers 2406, 2408 and 2410 to account for the OP2 delay and its pipeline register 2412.

Most binary operators require one clock cycle. However, some may require more, such as multiplication which may take two clock cycles (latency) with an internal pipeline stage to ensure single cycle throughput. Division, exponentiation, etc. may require even more clock cycles. Multiplication or division by fixed powers of two are special cases and may be immediately executed (i.e., no additional clock cycles), where implemented by hard-wiring.

Registers

Registers may be used to hold constants. In one embodiment of the invention, the constant values are written to their corresponding registers via the host computer. However, not all constants will be held in registers—some may be hard-wired into the design. For example, multiplication by a constant is far more efficient implemented as a hard-wired circuit than as a general purpose multiplier fed with a constant as one input. Registers may also be used to hold variables. In this case, the registers will both be readable and writable by both the hardware, and the host computer.

Memory Banks

As previously described, memory banks may be used in connection with the processing architecture. Because data-intensive computer applications involve a great deal of test or simulation data, the present invention provides one or more memory banks to store the test data prior to its execution by the processing architecture.

Other memory components may also be advantageously used in certain circumstances. These memory components can be used as equivalents to "arrays" in a programming language representation of the algorithm. In other words, to transform an algorithmic software routine that includes an array, an external memory component or memory bank may be used. As will be described more fully below, these additional memory components are independent of the bulk memory bank that provides the raw test data, and are instead used to increase the parallelism of memory accesses.

Each such external memory component is controlled by the memory controller to supply a word of data (or accept a word of data for writing) in every clock cycle. Thus, the processing clock rate held to be the same as the memory bus data rate. To prevent data bus conflicts and facilitate single-cycle execution, each memory bank has its own data, address and control bus. This can be seen in FIG. 25, which illustrates a data flow unit (DFU) 2500 coupled to receive information from multiple SDRAM banks 2502, 2504 and 2506. Each of the SDRAM banks includes a dedicated data, address, and control bus. For example, SDRAM bank 2502 includes data bus 2508, address bus 2510 and control bus 2512, which are distinct and separate from data bus 2514, address bus 2516 and control bus 2518 associated with SDRAM 2506.

These external memory devices are particularly advantageous in multi-dimensional computing as they increase the parallel nature of memory accesses. These memory components are separate from the bulk memory, which supplies the raw data stream. Instead, these external memory components are auxiliary memories that can be loaded by the host PCs. For example, in multi-dimension computing, an X array of data may be continually referenced while the processing architecture performs computations using the X array to generate a Y array. In such cases, it is not practical to continually supply the same X array via the bulk memory. Instead, the X array is loaded into an auxiliary memory component that can be accessed by the processing architecture. This in effect increases the parallelism of the memory accesses, which is described in greater detail below.

The algorithm program code may be transformed to reduce the number of reads and writes from external memory to some minimum of memory reads/writes per iteration of the inner loop. That minimum number of memory banks is provided to enable execution of one inner loop iteration per clock cycle. For example, consider a program having an inner loop that reads n adjacent elements from a one-dimensional array A (or a one-dimensional slice from a larger array), where the n array indices are functions of the loop index I, e.g., A[I], A[I+1], ..., A[I+n], and where one iteration of the inner loop is output in each clock cycle. Since the loop index I is incremented each iteration of the inner loop, i.e. in every clock cycle, the value read as A[I+n] in a given clock cycle will be re-read as A[I+n-1] in the following clock cycle, and as A[I] n cycles later. Therefore we can replace this succession of reads by a single read of A[I+n] whose result is stored in the first register of a pipeline consisting of n registers. The other data elements required are then taken from the n registers in the pipeline, wired directly to the appropriate processing units.

Figure 26:
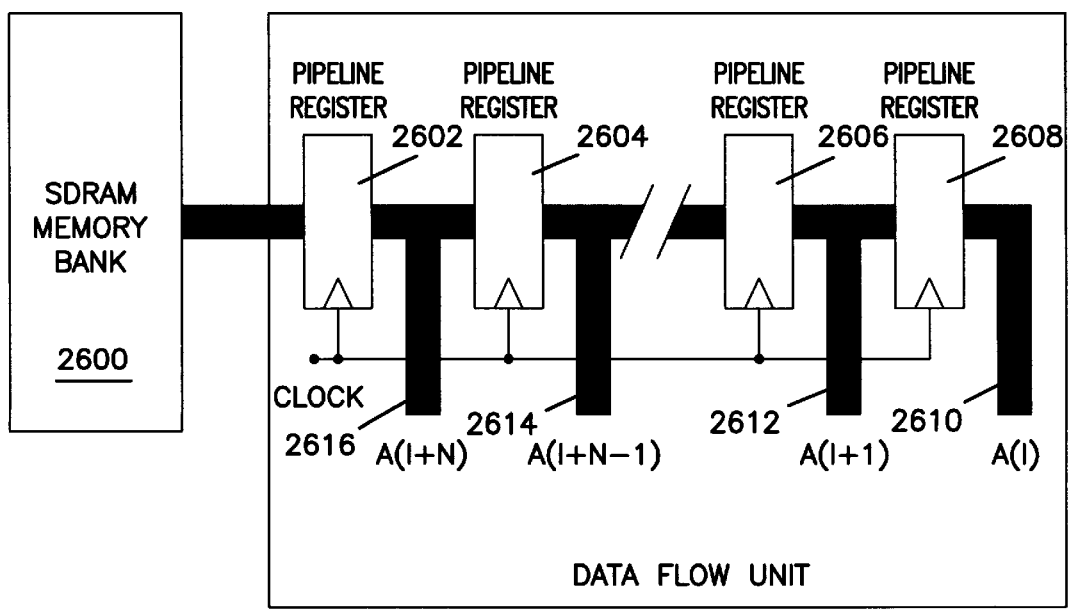
FIG. 26 provides an example embodiment of a register pipeline used to replace a succession of array reads.

Such a configuration is illustrated in FIG. 26, where an external memory bank 2600 provides the array elements to a series of pipeline registers 2602, 2604, 2606 and 2608.

The depth of the pipeline is dependent on the array being transformed, so a smaller or larger number of registers may be used. Each of the elements of the array is available at the output of its respective register, thereby providing the array indices A(I) at path 2610, and A(I+1) at path 2612. Depending on the number of registers in the pipeline, the last two array indices are A(I+N−1) on path 2614, and A(I+N) on path 2616.

Before actual processing begins, n clock cycles are required to fill the pipeline.

Actual processing during this filling time may experience a dormant period until the pipeline is filled. The "filling" clock cycles may result in additional overall output delays for very simple implementations of the invention. However, for large data sets, n will be small compared to the length of the array or slice, and therefore this unused time is of little consequence.

Similarly, processing a two-dimensional array (or slice of a larger array) using two or more nested loops may involve reading the same one-dimensional slice more than one time (e.g., m times) in successive iterations of the next-to-inner loop. The first time it is read, it may also be written to a small memory component, such as a cache memory, consisting of m one-dimensional vectors whose length L is the length of the original one-dimensional slice (and related to the loop count of the inner loop). Such a cache is best implemented on-chip, but if too large for the implementation technology, off-chip memory may be used with its own memory buses, at an economic cost. By combining these two techniques, a single read from the array may replace m*n read operations. This may be extended to three or more dimensions if desired.

An external memory bank as described above cannot be both read from and written to during the same clock cycle. Therefore, there are further restrictions on interleaving reads and writes to the same memory component (e.g. bus turn-around time). To maximize performance, reads and writes will normally be to separate banks of memory. This may impose additional constraints on the architecture required to implement a given software routine in hardware.

Register Writes

Figure 27:
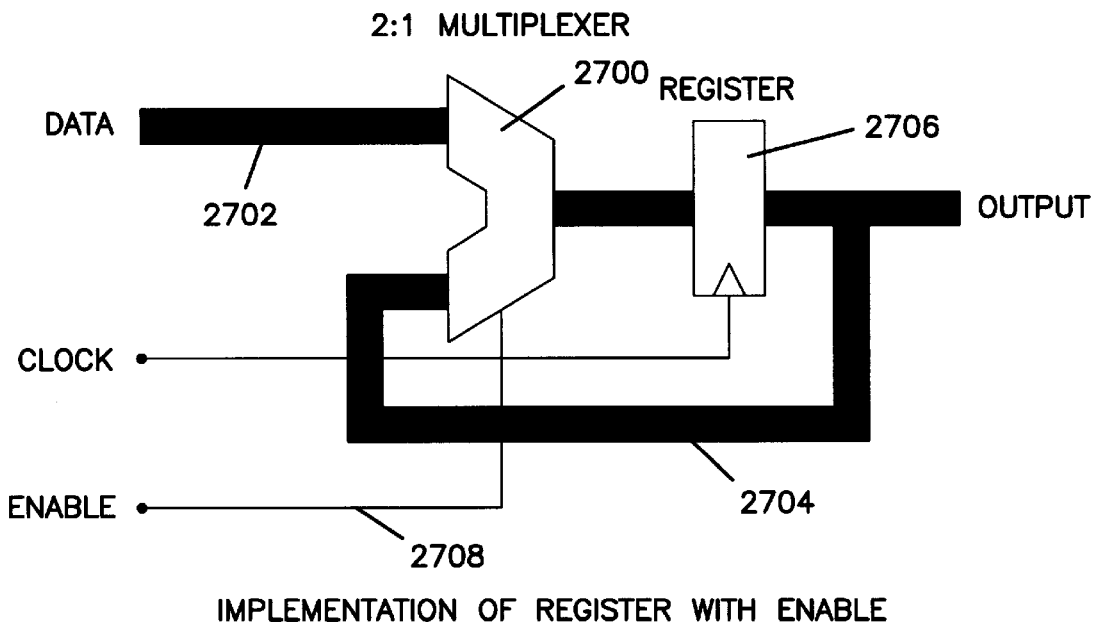
FIG. 27 is a block diagram of a registered selector capable of outputting either a current input or immediately preceding data input according to one embodiment of the invention.

If a register is both read from and written to in a deeply pipelined design, care may be required to ensure that the value read is appropriate to the pipeline stage reading it. If necessary, storing previous values in a pipeline can achieve this. These registers may be selectively updated, according to conditions, while a pipeline register is continuously updated in every clock cycle. This can be accomplished with a multiplexer selecting its own output or a new input, and a continuous clock, as shown in FIG. 27. In this diagram, the multiplexer 2700 selects either the new data on path 2702, or the data's previous state on path 2704 at the output of register 2706. The multiplexer 2700 is controlled by the enable signal on path 2708.

Multiplexers

Multiplexers are used to select one of several different possible values or actions according to the computed values of conditional expressions. Multiplexers can replace conditional statements and case statements as described below.

Conditional statements: Conditional statements include statements such as if-then-else constructs. The control expression is evaluated to produce a Boolean result. Both statement arms (i.e., then, else) are executed in parallel, although no results are committed (i.e. no variable register or memory locations are written). Where these three operations can be performed in a single clock cycle, a multiplexer controlled by the Boolean control expression can be used to select between the statement arms. If these three operations take different lengths of time, their results are delayed in pipelines until all three are complete. At this point, the control expression result is used to commit the results in one of the statement arms and discard the others.

Figure 28:
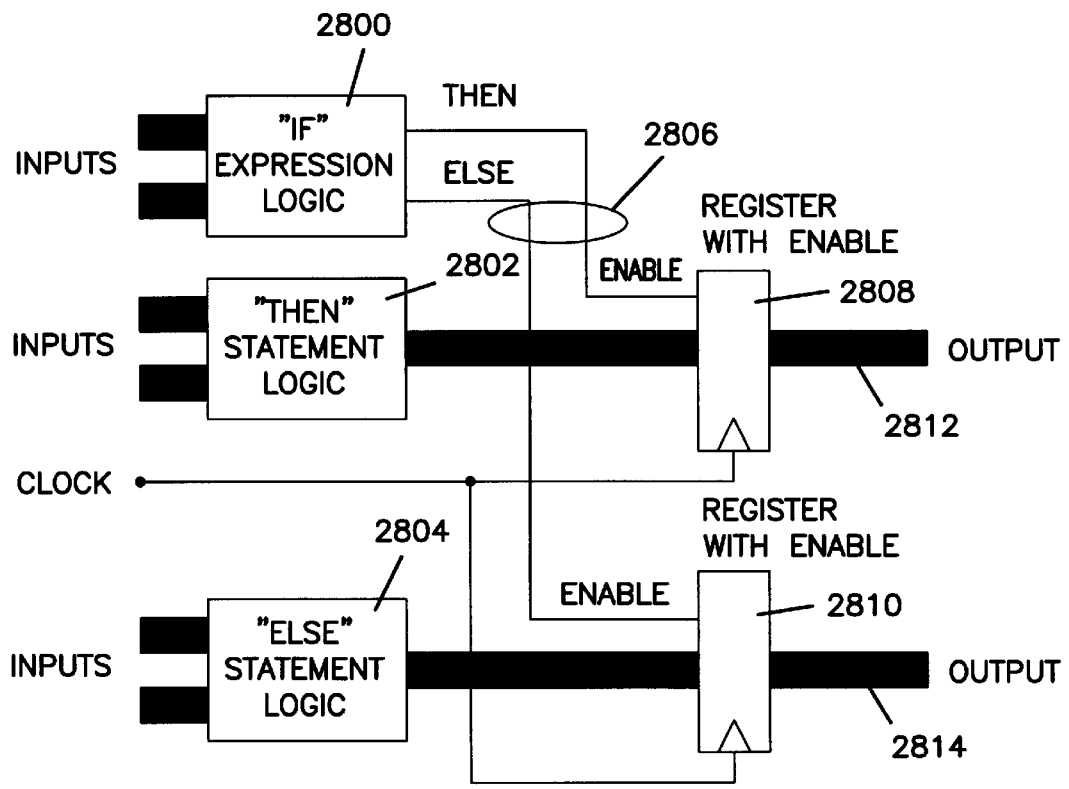
FIG. 28 is a block diagram illustrating an example embodiment of a hardware implementation of a conditional statement using registers and register enables.

FIG. 28 is a block diagram illustrating an example embodiment of a hardware implementation of a conditional statement using registers and register enables. Where the operations of the conditional statement can not be completed in the same clock cycle, registers having register enables can be used. In the example of FIG. 28, inputs are provided to the IF expression logic 2800, the THEN statement logic 2802 and the ELSE statement logic 2804. The IF expression logic 2800 provides control signals 2806 to registers 2808 and 2810. Depending on the state of the control signals 2806, the appropriate register 2808, 2810 is enabled to output the appropriate result at output 2812 or 2814.

Case statements: The control expression is evaluated to produce a constrained type result (e.g. a number from 1 to n). The n statement arms are executed in parallel, without committing any results. Again, pipelines may be required to synchronize all statement arms with the control expression. Finally, the statement arm indicated by the control expression is committed, all other results are discarded.

Counters and Control Circuitry

Counters and control circuitry is used to simulate the effect of algorithm loop constructs. For example, the inner loop is executed until some condition becomes true, which terminates the loop. In the case of a "for" loop, the condition corresponds to a set number of iterations to be performed. The number of iterations performed (the loop variable) is recorded using a counter, which also provides an index for array addressing. The counter value is compared to a known value stored in a register, and when equal, the loop is terminated.

Given these general transformation rules, and the architectural teachings of the sustained-execution processing module provided above, those skilled in the art can construct computing modules capable of providing sustained, peak performance for data-intensive computing applications. The invention provides for the mapping of a core algorithm (not just an instruction) into hardware for single-cycle execution. It is important to note that the invention as described above needs only a clock pulse and a processing start/stop indicator to fully execute the entire algorithm as many times as required by the simulation. In other words, there is no program, no program memory, no program counter, no memory fetching, no address decode stages, no branch logic, and the like. The invention can merely be coupled to a host computer to receive the raw input data and a start/stop indicator, and the sustained, peak-performance processor does the rest by generating an algorithm output on each clock cycle.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. A hardware processing architecture for performing repeated algorithm iterations, wherein each of the algorithm iterations is performed on a parallel set of algorithm input data, comprising:

a memory arranged to store the algorithm input data in parallel, contiguous bit locations;

a parallel execution module having a plurality of functional execution units, wherein each of the functional execution units is configured to perform a preassigned function dictated by the algorithm on predetermined bits of each iterative parallel set of algorithm input data; and a data flow module coupled to the memory and to the parallel execution module, configured and arranged to replicate in hardware the control constructs and expression evaluations of the algorithm, and to distribute the input data to the plurality of function execution units in accordance with the control constructs and expression evaluations of the algorithm.

2. The hardware processing architecture as in claim 1, wherein the data flow module further comprises a pipeline structure to synchronize the arrival of input data at each of the plurality of functional execution units that would otherwise receive the input data on non-corresponding clock cycles.

3. The hardware processing architecture as in claim 2, wherein the pipeline structure further comprises a function pipeline structure arranged to pipeline all of the preassigned functions, control constructs and expression evaluations to provide an output for each algorithm iteration in each clock cycle.

4. A processing system for carrying out data-intensive computing applications, comprising:

at least one data server capable of outputting stored test data;

one or more host computing devices coupled to receive the test data from the data server; and one or more processing modules within each of the one or more host computing devices, wherein each of the processing modules within a corresponding one of the host computing devices is coupled to receive the test data from its corresponding one of the host computing devices, each processing module comprising:

a memory arranged to store the algorithm input data in contiguous, parallel bit locations;

a parallel execution module having a plurality of functional execution units, wherein each of the functional execution units is configured to perform a preassigned function dictated by the algorithm on predetermined bits of each iterative parallel set of algorithm input data; and a data flow module coupled to the memory and to the parallel execution module, configured and arranged to replicate in hardware the control constructs and expression evaluations of the algorithm, and distribute the input data to the plurality of function execution units in accordance with the control constructs and expression evaluations dictated by the algorithm.

5. A hardware processing architecture for performing repeated algorithm iterations, wherein an algorithm iteration associated with each parallel set of algorithm simulation data is output in each cycle of a clock signal, the processing architecture comprising:

a memory arranged to store the algorithm simulation data in contiguous bit locations;

a plurality of function execution means, each for performing a predetermined function of the algorithm given a predetermined portion of the simulation data;

data distribution means coupled to the memory for receiving the simulation data, and for distributing the simulation data to each of the function execution means as dictated by the algorithm;

control structure means, integrally interposed with the data distribution means, for replicating the algorithm control constructs and expression evaluations in hardware; and data synchronization means, integrally interposed with the data distribution means, for synchronizing the arrival of confluent simulation data streams at each of the function execution means and the control structure means, whereby one algorithm iteration is output in each clock cycle.

6. A method for transforming an algorithm into a hardware implementation of the algorithm, wherein the resulting algorithm implementation produces an algorithm output for each iterative loop of the algorithm in each clock cycle, the method comprising:

outputting a parallel set of the stored test data from the processing memory in each of the clock cycles;

repetitively performing predetermined functions of the algorithm on each of the parallel sets of test data output from the processing memory, using corresponding functional execution units;

distributing the test data via discrete transmission paths to the functional execution units according to the control constructs and expression evaluations of the algorithm; and synchronizing the arrival of confluent test data streams for each of the predetermined functions, control constructs and expression evaluations of the algorithm implementation; and fully pipelining the predetermined functions, control constructs and expression evaluations to provide an output for each iterative loop of the algorithm in each clock cycle.

* * * * *